United States Patent
Kon et al.

(10) Patent No.: US 7,980,458 B2
(45) Date of Patent: Jul. 19, 2011

(54) ELECTRONIC WALLET DEVICE AND COMMUNICATION METHOD

(75) Inventors: Takayasu Kon, Tokyo (JP); Yasunori Kamada, Kanagawa (JP); Takashi Fukushima, Tokyo (JP); Yoichiro Sako, Tokyo (JP); Miki Abe, Kanagawa (JP); Masamichi Asukai, Kanagawa (JP); Taiji Ito, Kanagawa (JP); Akane Sano, Tokyo (JP); Mitsuru Takehara, Tokyo (JP)

(73) Assignee: Sony Corporation, Tokyo (JP)

( * ) Notice: Subject to any disclaimer, the term of this patent is extended or adjusted under 35 U.S.C. 154(b) by 381 days.

(21) Appl. No.: 12/229,063

(22) Filed: Aug. 19, 2008

(65) Prior Publication Data

US 2009/0050688 A1    Feb. 26, 2009

(30) Foreign Application Priority Data

Aug. 23, 2007   (JP) .................... 2007-217479

(51) Int. Cl.
*G06F 17/00*   (2006.01)
*G06K 5/00*   (2006.01)
*G06K 7/00*   (2006.01)

(52) U.S. Cl. ..... 235/375; 235/380; 235/382; 235/382.5; 235/451; 235/486; 235/487; 235/492; 340/5.4; 340/5.41; 340/5.52; 340/5.54; 340/572.1; 705/39; 705/40; 705/41; 705/42; 705/43; 705/44; 705/45

(58) Field of Classification Search ................. 235/375, 235/380, 451, 486, 487, 492, 382, 382.5; 340/5.4, 5.41, 5.52, 5.54, 5.56, 572.1; 705/39–45
See application file for complete search history.

(56) References Cited

U.S. PATENT DOCUMENTS

| | | | | |
|---|---|---|---|---|
| 4,692,745 | A * | 9/1987 | Simanowitz | 340/568.7 |
| 5,748,737 | A * | 5/1998 | Daggar | 705/41 |
| 5,778,067 | A | 7/1998 | Jones | |
| 5,987,438 | A * | 11/1999 | Nakano et al. | 705/41 |
| 6,128,604 | A * | 10/2000 | Sakamaki et al. | 705/41 |
| 6,155,410 | A * | 12/2000 | Davis | 206/39.5 |
| 7,269,445 | B2 | 9/2007 | Natsuno | |
| 7,308,771 | B2 * | 12/2007 | Memelink | 40/649 |
| 7,533,826 | B2 * | 5/2009 | Phillips | 235/486 |
| 7,635,089 | B2 * | 12/2009 | Augustinowicz et al. | 235/486 |
| 2004/0035930 | A1 | 2/2004 | Arisawa | |

(Continued)

FOREIGN PATENT DOCUMENTS

EP    1028398 A2    8/2000

(Continued)

*Primary Examiner* — Thien M. Le
*Assistant Examiner* — Tuyen K Vo
(74) *Attorney, Agent, or Firm* — Wolf, Greenfield & Sacks, P.C.

(57) ABSTRACT

There is provided an electronic wallet device including a holding section to hold a plurality of non-contact type IC cards, an external communication antenna to perform non-contact communication with an external unit, a card communication antenna to perform non-contact communication with the IC cards held in the holding section, a card selecting section to select at least one IC card by narrowing down candidates for an IC card to be used for communication with the external unit from the plurality of IC cards based on a plurality of different card selection criteria, and a communication control section to connect the selected IC card with the external unit via the external communication antenna and the card communication antenna so that the selected non-contact type IC card and the external unit communicate with each other.

9 Claims, 13 Drawing Sheets

U.S. PATENT DOCUMENTS

| | | |
|---|---|---|
| 2008/0190784 A1* | 8/2008 | Phillips .................. 206/39 |
| 2009/0050686 A1 | 2/2009 | Kon et al. |
| 2009/0050687 A1 | 2/2009 | Kon et al. |
| 2009/0050689 A1 | 2/2009 | Sako et al. |
| 2009/0052695 A1 | 2/2009 | Yamada et al. |

FOREIGN PATENT DOCUMENTS

| | | |
|---|---|---|
| EP | 1560172 A1 | 8/2005 |
| EP | 1603062 A1 | 12/2005 |
| EP | 1732032 A2 | 12/2006 |
| EP | 2028627 A1 | 2/2009 |
| FR | 2810435 A | 12/2001 |
| JP | 11-509712 A | 8/1999 |
| JP | 2000-076399 A | 3/2000 |
| JP | 2000-123138 A | 4/2000 |
| JP | 2000-259901 A | 9/2000 |
| JP | 2002-197518 A | 7/2002 |
| JP | 2003-187167 A | 7/2003 |
| JP | 2003-187173 A | 7/2003 |
| JP | 2003-256751 A | 9/2003 |
| JP | 2003-330898 A | 11/2003 |
| JP | 2004-005734 A | 1/2004 |
| JP | 2004-139604 A | 5/2004 |
| JP | 2004-192476 A | 7/2004 |
| JP | 2004-243011 A | 9/2004 |
| JP | 2005-011044 | 1/2005 |
| JP | 2005-242444 | 9/2005 |
| JP | 2005-242594 A | 9/2005 |
| JP | 2005-266879 | 9/2005 |
| JP | 2005-293444 A | 10/2005 |
| JP | 2005-312925 A | 11/2005 |
| JP | 2006-003932 A | 1/2006 |
| JP | 2006-073028 A | 3/2006 |
| JP | 2006-155045 A | 6/2006 |
| JP | 2006-318453 A | 11/2006 |
| WO | WO02-061572 A1 | 8/2002 |
| WO | WO 2005/027035 A1 | 3/2005 |
| WO | WO 2005/093667 A1 | 10/2005 |

* cited by examiner

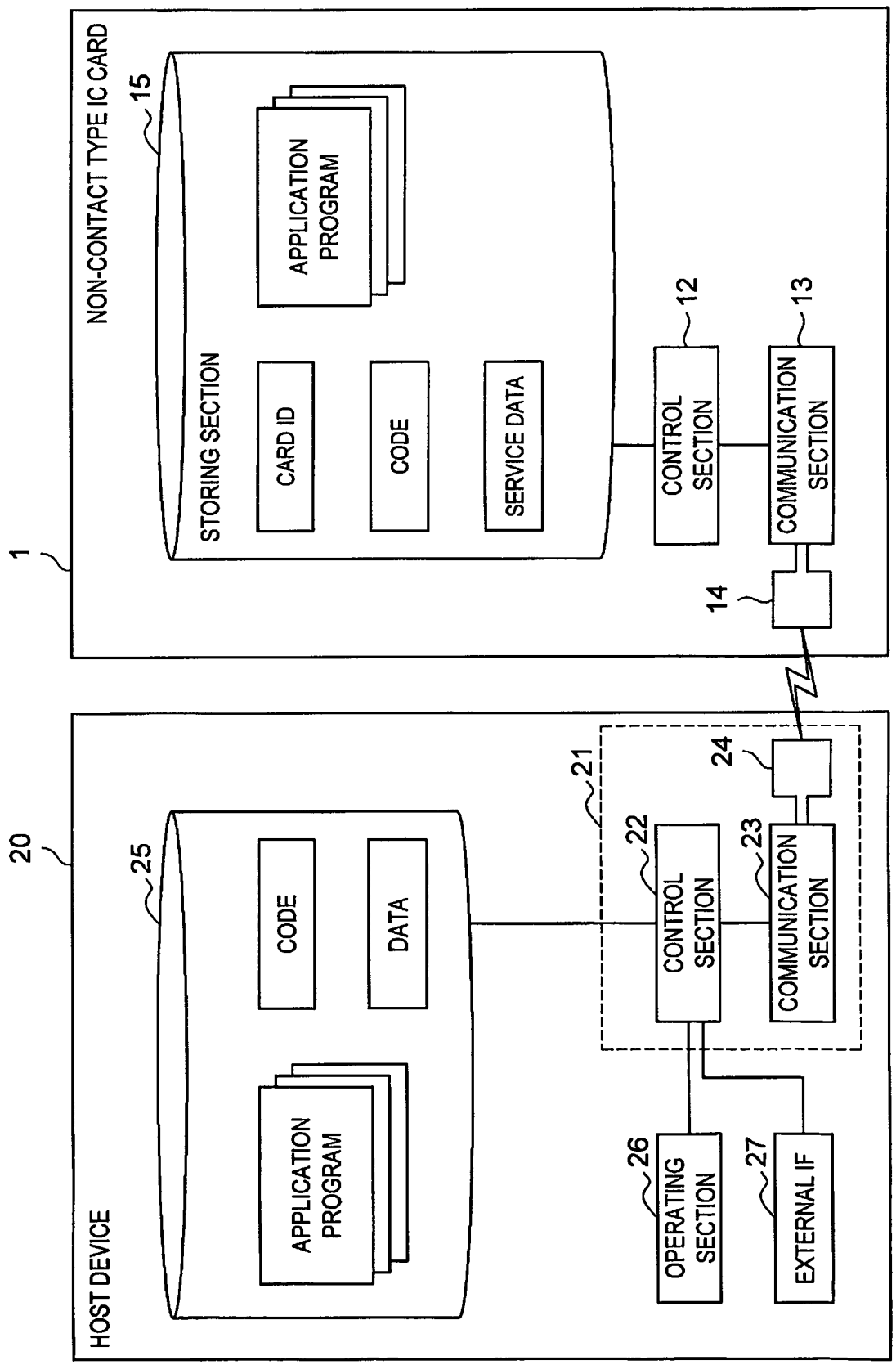

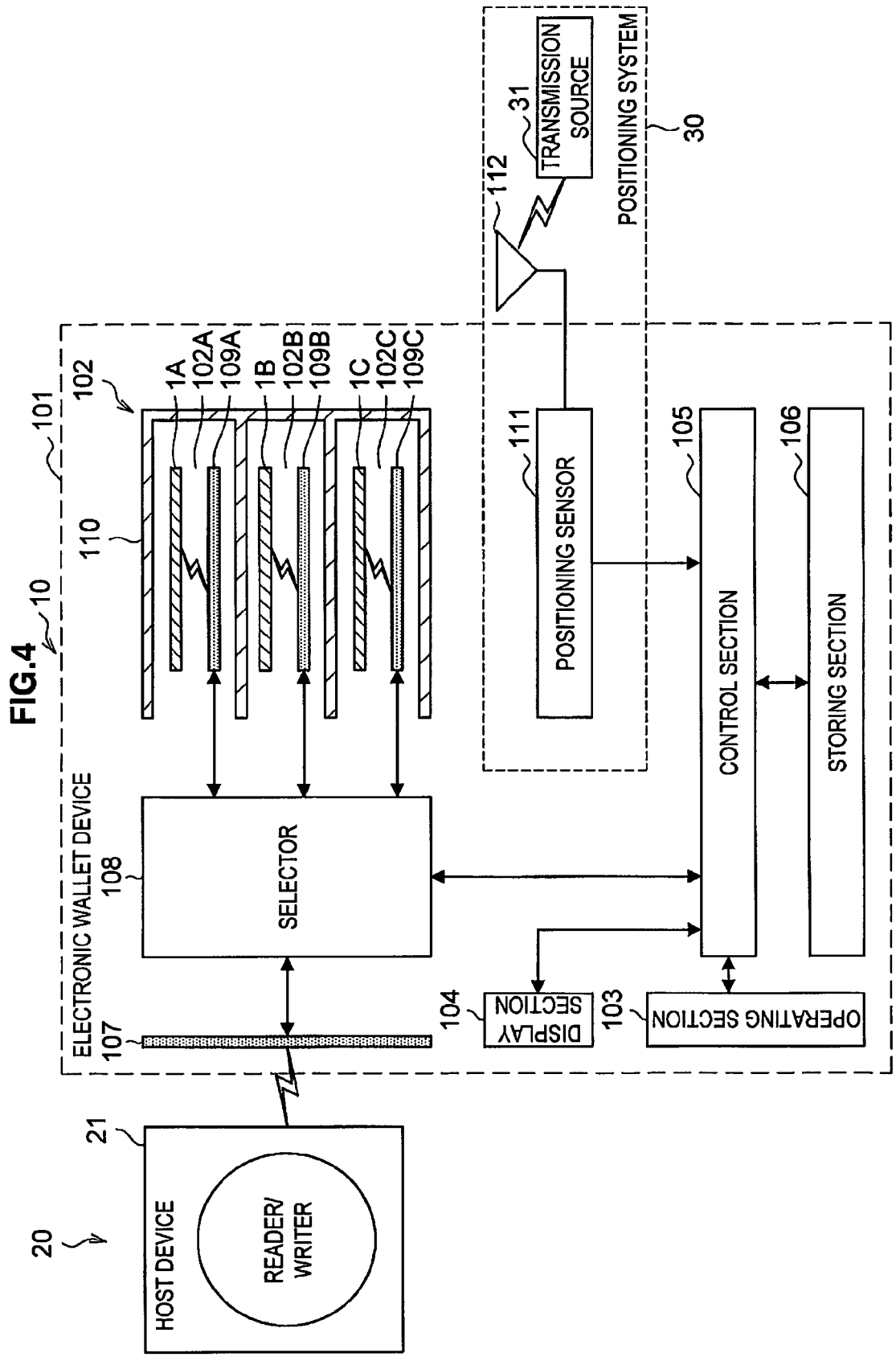

US 7,980,458 B2

ELECTRONIC WALLET DEVICE AND COMMUNICATION METHOD

CROSS REFERENCES TO RELATED APPLICATIONS

The present invention contains subject matter related to Japanese Patent Application JP 2007-217479 filed in the Japan Patent Office on Aug. 23, 2007, the entire contents of which being incorporated herein by reference.

FIELD OF THE INVENTION

The present invention relates to an electronic wallet device and a communication method and, particularly to an electronic wallet device or the like for suitably selecting a card to be used for communication with an external unit from a plurality of non-contact type IC cards held in the electronic wallet device.

DESCRIPTION OF THE RELATED ART

Services using a non-contact type IC card which includes an antenna coil and an IC chip are becoming increasingly widely available in daily use. A non-contact type IC card can perform data communication when it is simply held over a reader/writer of a host device without being taken out of a wallet, an IC card holder or the like, thus being highly convenient. Therefore, such a non-contact type IC card is widely used in IC card systems which provide various services such as an electronic money service and a transportation ticket gate service, for example. With the increasing range of uses for a non-contact type IC card, it is becoming increasingly common that a user carries a plurality of non-contact type IC cards for the same or different kinds of services.

Generally, a user carries a plurality of non-contact type IC cards using a wallet, a bag, an IC card holder and so on. If a plurality of non-contact type IC cards which are carried all together are held over a reader/writer at the same time, the plurality of non-contact type IC cards exist within a communication range of the reader/writer (within an effective area of an electromagnetic wave emitted by the reader/writer). In such a case, antenna coils of the plurality of non-contact type IC cards magnetically couple with each other, causing a large deviation from the original resonance frequency to disable communication of any non-contact type IC cards.

As a technique that addresses such an issue, an IC card holder in which an anti-interference part is placed between two non-contact type IC cards is proposed in Japanese Unexamined Patent Application Publication No. 2005-11044, for example. However, the IC holder is inconvenient in that it is necessary to hold the side of the IC holder where a desired non-contact type IC card is placed at the time of use, and therefore a user has to select a card to use after all.

Further, in order to deal with the case of holding a plurality of non-contact type IC cards over a reader/writer at the same time, it is necessary that the non-contact type IC cards support a function of detecting and avoiding data collision ("anti-collision"). Anti-collision is a method for individually processing each card when a plurality of non-contact type IC cards exist within a communication area of a reader/writer, and there are a time slot method, a slot marker method and so on, for example.

SUMMARY OF THE INVENTION

With the current state of the art, however, while some IC card systems support anti-collision, other IC card systems do not support anti-collision. In the latter systems, if a plurality of non-contact type IC cards are held over a reader/writer of a host device, the reader/writer fails to recognize the respective cards. Accordingly, a user inconveniently has to take a desired non-contact type IC card out of the IC card holder and hold it over the reader/writer.

On the other hand, a transmission system of a proximity non-contact type IC card is standardized by the international standard of ISO/IEC 14443. This standard provides a framework for preferentially selecting any card when there are a plurality of non-contact type IC cards within a communication range of a reader/writer. For example, in the type-B system mode which is standardized by ISO/IEC 14443, it is possible to designate an identifier for identifying application (e.g. application to transportation, electronic money etc.) of a non-contact type IC card to be selected by a "REQB command" that is a request command which is transmitted from a reader/writer in order to detect a non-contact type IC card. In this case, the only non-contact type IC card which has a designated identifier responds to the reader/writer, thereby selecting the desired non-contact type IC card.

However, even with such a card selection technique, when a plurality of non-contact type IC cards which are applicable to the same kind of service are carried, it is unable to automatically select a card desired by a user. In an actual use case, it is often the case that a user does not distinguish a plurality of non-contact type IC cards in consideration of whether each non-contact type IC card supports anti-collision and carries a plurality of non-contact type IC cards for the same or different kinds of services all together. Further, depending on the kind of a non-contact type IC card such as a transportation card, there is a card which is available in a particular area or system only. Furthermore, there is the case where a user wishes to select a card to be used or a card not to be used from a plurality of same kind of cards which the user carries. Under the circumstances where a user carries a plurality of various different kinds of non-contact type IC cards, there has been a need for a mechanism for accurately selecting a card to be used for communication with the reader/writer from a plurality of non-contact type IC cards.

In light of this, it is desirable to provide a novel and improved electronic wallet device and a communication method which accurately select a desired card from a plurality of non-contact type IC cards that are carried all together regardless of whether the non-contact type IC cards support anti-collision and perform communication with an external unit.

According to an embodiment of the present invention, there is provided an electronic wallet device which includes a holding section to hold a plurality of non-contact type IC cards capable of non-contact communication with an external unit; an external communication antenna to perform non-contact communication with the external unit; a card communication antenna to perform non-contact communication with the plurality of non-contact type IC cards held in the holding section; a card selecting section to select at least one non-contact type IC card by narrowing down candidates for a non-contact type IC card to be used for communication with the external unit from the plurality of non-contact type IC cards held in the holding section based on a plurality of different card selection criteria when receiving a communication request concerning a prescribed service from the external unit via the external communication antenna; and a communication control section to connect the non-contact type IC card selected by the card selecting section with the external unit via the external communication antenna and the card communication antenna so that the selected non-contact type IC card and the external unit communicate with each other.

In this configuration, when the electronic wallet device receives a communication request concerning a prescribed service from the external unit via the external communication antenna, the card selecting section selects at least one non-contact type IC card by narrowing down candidates for a non-contact type IC card to be used for communication with the external unit from the plurality of non-contact type IC cards held in the holding section based on a plurality of different card selection criteria. Further, the communication control section connects the non-contact type IC card selected by the card selecting section with the external unit via the external communication antenna and the card communication antenna so as to communicate with each other. It is thereby possible to automatically select the non-contact type IC card which is appropriate for communication with the external unit concerning the prescribed service from the plurality of non-contact type IC cards held in the holding section based on a plurality of card selection criteria and perform data communication concerning the prescribed service between the selected non-contact type IC card and the external unit. This enables suitable communication by selecting a desired non-contact type IC card regardless of whether or not the plurality of non-contact type IC cards held in the electronic wallet device support anti-collision.

The card selecting section may narrow down candidates for a non-contact type IC card to be used for communication with the external unit by applying the plurality of card selection criteria sequentially in accordance with priorities based on a code contained in the communication request. The code which is contained in the communication request from the external unit corresponds to a service that is provided by the external unit. It is thus possible to narrow down candidate cards by applying the plurality of card selection criteria sequentially in the order appropriate for the service of the external unit to be communicated with, thereby enabling efficient card selection processing.

The card selecting section may select at least part of the plurality of card selection criteria based on a code contained in the communication request and narrow down candidates for a non-contact type IC card to be used for communication with the external unit by applying the selected card selection criteria sequentially. It is thus possible to make a choice of the card selection criteria appropriate for the service of the external unit to be communicated with and narrow down candidate cards by applying the appropriate card selection criteria, thereby enabling efficient card selection processing.

The electronic wallet device may further include a storing section to store service area information indicating a service area where each non-contact type IC card is available, and the card selecting section may acquire current location information of the electronic wallet device from a positioning system to detect current location of the electronic wallet device and narrow down candidates for a non-contact type IC card to be used for communication with the external unit based on the current location information and the service area information read out from the storing section. It is thus possible to narrow down candidate cards based on the available area of the non-contact type IC card, thereby enabling selection of an appropriate non-contact type IC card which is available in the current location of the electronic wallet device.

The electronic wallet device may further include a card inside information registration section to register a code concerning a service to which each of the plurality of non-contact type IC cards held in the holding section corresponds onto a storing section, and the card selecting section may narrow down candidates for a non-contact type IC card to be used for communication with the external unit based on a code contained in the communication request received from the external unit and the code read out from the storing section. It is thus possible to narrow down candidate cards based on the code transmitted from the external unit and received by the electronic wallet device, thereby enabling selection of an appropriate non-contact type IC card which is applicable to the service provided by the external unit.

The card selecting section may narrow down candidates for a non-contact type IC card to be used for communication with the external unit based on card inside information stored in each of the plurality of non-contact type IC cards held in the holding section. It is thus possible to narrow down candidate cards based on the card inside information, thereby enabling selection of an appropriate non-contact type IC card from a plurality of non-contact type IC cards applicable to the same kind of service.

The electronic wallet device may further include a priority determination section to determine priorities of the plurality of non-contact type IC cards for each service based on the card inside information, and the card selecting section may narrow down candidates for a non-contact type IC card to be used for communication with the external unit based on the priorities determined by the priority determination section. It is thus possible to select an appropriate non-contact type IC card for a service by previously setting the priorities for each service upon card selection based on the card inside information.

The electronic wallet device may further include a non-use card registration section to register non-use card information indicating a non-use card designated by a user onto a storing section, and the card selecting section may exclude the non-use card from candidates for a non-contact type IC card to be used for communication with the external unit based on the non-use card information read out from the storing section. It is thus possible to exclude the non-use card designated by a user from candidate cards, thereby preventing a card that is not desired by a user from being selected automatically.

The electronic wallet device may further include a priority card registration section to register priority card information indicating a priority card designated by a user onto a storing section, and the card selecting section may preferentially select the priority card as a candidate for a non-contact type IC card to be used for communication with the external unit based on the priority card information read out from the storing section. It is thereby possible to select the priority card that is directed by a user preferentially as a candidate card.

According to another embodiment of the present invention, there is provided a communication method in an electronic wallet device including a holding section to hold a plurality of non-contact type IC cards capable of non-contact communication with an external unit, an external communication antenna to perform non-contact communication with the external unit, and a plurality of card communication antennas to perform non-contact communication with the plurality of non-contact type IC cards held in the holding section. The method includes the steps of selecting at least one non-contact type IC card by narrowing down candidates for a non-contact type IC card to be used for communication with the external unit from the plurality of non-contact type IC cards held in the holding section based on a plurality of different card selection criteria when receiving a communication request concerning a prescribed service from the external unit via the external communication antenna; and connecting the non-contact type IC card selected by the card selecting section with the external unit via the external communication antenna and the card communication antenna so that the selected non-contact type IC card and the external unit communicate with each other.

According to the embodiments of the present invention described above, it is possible to accurately select a desired card from a plurality of non-contact type IC cards that are carried all together regardless of whether the non-contact type IC cards support anti-collision and perform communication with an external unit.

BRIEF DESCRIPTION OF THE DRAWINGS

FIG. 3 is a block diagram showing an example of the configuration of a reader/writer of a host device and a non-contact type IC card in an IC card system according to the embodiment.

FIG. 4 is a block diagram showing the schematic configuration of the electronic wallet device according to the embodiment.

DETAILED DESCRIPTION OF THE PREFERRED EMBODIMENTS

Figure 1:
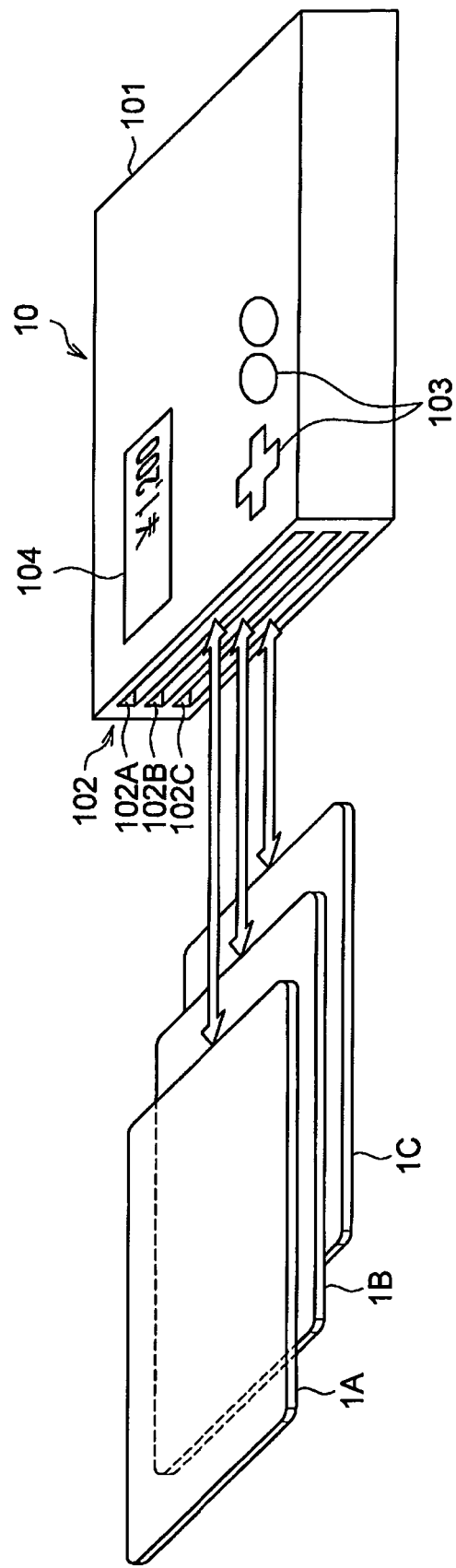
FIG. 1 is a perspective view showing the external structure of the electronic wallet device according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The appearance of an electronic wallet device according to a first embodiment of the present invention is described hereinafter with reference to FIG. 1. FIG. 1 is a perspective view showing the external structure of an electronic wallet device 10 of this embodiment.

As shown in FIG. 1, the electronic wallet device 10 of this embodiment is an electronics device with a size that allows a user to carry it in a pocket of clothing, a bag, or the like. The electronic wallet device 10 serves as a holding case which can hold a plurality of non-contact type IC cards 1A, 1B and 1C (which may be hereinafter referred to collectively as the non-contact type IC cards 1). A user can carry the plurality of non-contact type IC cards 1 all together by holding them in the electronic wallet device 10.

The electronic wallet device 10 includes a casing 101 having a substantially rectangular solid shape, a holding section 102 which detachably holds a plurality of non-contact type IC cards 1, an operating section 103 which serves as a user input interface, and a display section 104 which displays information regarding a service using the non-contact type IC card 1, for example.

The holding section 102 includes a plurality of slots 102A, 102B and 102C which are arranged in parallel with each other on one side surface of the casing 101, for example. The non-contact type IC cards 1A to 1C are inserted to and removed from the slots 102A to 102C, so that the non-contact type IC cards 1 can be detachably attached to the electronic wallet device 10.

Although the electronic wallet device 10 in the example of FIG. 1 includes three slots 102A to 102C so as to hold three non-contact type IC cards 1A to 1C, the present invention is not limited thereto. For example, the number of the non-contact type IC cards 1 which can be held in the electric wallet device 10 may be two or more than three. If all of the non-contact type IC cards 1 to be held have the same shape, the slots 102A to 102C may have the same shape. However, in order to cope with various shapes or sizes of non-contact type IC cards 1, the holding section 102 may have different shapes of slots 102A to 102C.

The non-contact type IC card 1 according to this embodiment is described hereinafter in detail. The non-contact type IC card 1 includes an antenna for performing non-contact communication with a reader/writer (data reading/writing unit) of a host device, and an IC chip which includes an IC that can execute prescribed processing, within a thin card case (cf. FIG. 3). The non-contact type IC card 1 can thereby perform radio communication with a reader/writer of a host device in a non-contact manner. It is thereby possible to read or write data in the non-contact type IC card 1 simply by locating the non-contact type IC card 1 within an effective area of an electromagnetic wave emitted from a reader/writer (or, simply by holding the non-contact type IC card 1 over a reader/writer). Thus, the non-contact type IC card 1 is convenient in that it is easy to use because there is no need to insert/remove the card to/from a reader/writer, it can transmit and receive data quickly, it is not easy to modify or alter to provide high security, and it is reusable by rewriting data.

Because of such convenience, the non-contact type IC card 1 is widely applied to IC card systems which provide various kinds of services. For example, the non-contact type IC card 1 is applied to an electronic money system, a transportation ticket gate system, an expressway toll collection system, an electronic settlement system, a security system for entry to a building or a room or login to a personal computer (PC), and so on. The non-contact type IC card 1 may be applied to the following uses (1) to (6), for example:

(1) an electronic money card which stores currency data of electronic money;

(2) a transportation card which stores data of a commuter pass, a reserved seat ticket, a prepaid fare or the like of transportation such as a train, a bus and an expressway;

(3) a personal authentication card which can serve as an identification card such as an employee identification card and a student identification card that is used for identification and attendance management or as a key for entry to and exit from a building;

(4) a membership card, a point card or a coupon card of stores or facilities;

(5) an electronic ticket card which stores electronic ticket data of a theater, a concert hall, a stadium, an amusement facility or the like; and (6) an electronic settlement card which is used for electronic commerce such as internet shopping, video or music contents delivery, and trading of financial products such as a stock and a deposit.

Further, a multi-application type card which has the multiple functions in one non-contact type IC card 1 has been developed, and the non-contact type IC card 1 is becoming increasingly diversified.

The electronic wallet device 10 according to this embodiment has a structure that is capable of holding a plurality of various non-contact type IC cards 1. A user can thereby carry a plurality of non-contact type IC cards 1 all together by holding them in the electronic wallet device 10. Further, at the time of communication with a reader/writer of a host device, the electronic wallet device 10 can automatically select a card that is appropriate for use in the communication with the reader/writer from the plurality of non-contact type IC cards 1 by sequentially applying a plurality of card selection criteria. Thus, when using a card, a user simply holds the electronic wallet device 10 which contains the plurality of non-contact type IC cards 1 over a reader/writer 21 of the host device as shown in FIG. 2, and the electronic wallet device 10 automatically selects an appropriate non-contact type card 1 to thereby establish communication with the reader/writer 21. The user can thereby receive a desired service using the non-contact type IC card 1 without taking out the relevant non-contact type IC card 1 from the electronic wallet device 10.

Figure 2A:
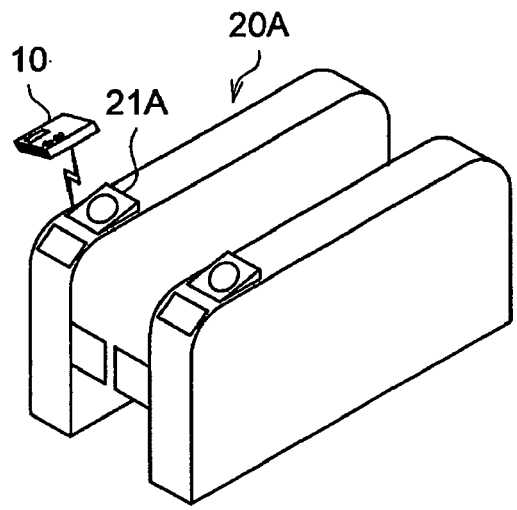
FIGS. 2A to 2C are explanatory views showing the situations of using the electronic wallet device according to the embodiment.

For example, as shown in FIG. 2A, at a transportation ticket gate, a user holds the electronic wallet device 10 which contains a plurality of non-contact type IC cards 1 over a reader/writer 2 1A of an automatic transportation ticket gate 20A. Then, an appropriate transportation card is selected from the plurality of non-contact type IC cards 1 which are contained in the electronic wallet device 10, and information about payment of a transportation fee is exchanged between the selected transportation card and the reader/writer 21A.

Figure 2B:
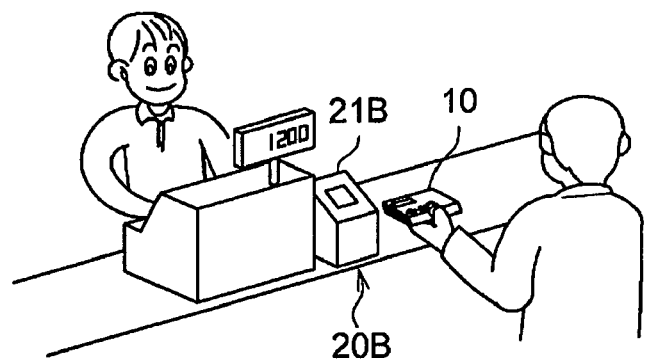

For another example, as shown in FIG. 2B, at a store such as a convenience store or a department store, a user holds the electronic wallet device 10 over a reader/writer 21B of a cash register device 20B. Then, an appropriate electronic money card is selected from the plurality of non-contact type IC cards 1 which are contained in the electronic wallet device 10, and information about payment of a product fee is exchanged between the selected electronic money card and the reader/writer 21B.

Figure 2C:
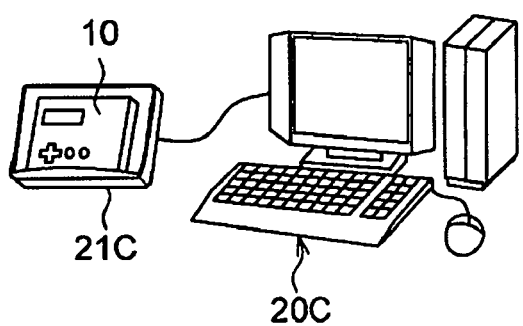

For yet another example, as shown in FIG. 2C, in electronic commerce using a user terminal 20C (e.g. a personal computer) which is connected to the internet or the like, a user holds the electronic wallet device 10 over a reader/writer 21C of the user terminal 20C. Then, an appropriate electronic settlement card is selected from the plurality of non-contact type IC cards 1 which are contained in the electronic wallet device 10, and information about electronic commerce is exchanged between the selected electronic settlement card and the reader/writer 21C.

As described above, if the electronic wallet device 10 according to this embodiment is located within a communication area of the reader/writer 21 of the host device 20, the non-contact type IC card 1 which corresponds to the service that is provided by the host device 20 is automatically selected, and information concerning a desired service is exchanged between the selected non-contact type IC card 1 and the host device 10. In FIG. 2, host devices such as the automatic transportation ticket gate 20A, the cash register device 20B and the user terminal 20C are illustrated as external units to be communicated with the electronic wallet device 10. Besides those devices, other arbitrary external units which are capable of non-contact communication with the non-contact type IC card 1, such as an automatic vending machine of products or tickets, a points of sale (POS) terminal, a kiosk terminal, and an automatic teller machine (ATM) of a financial institution, may be used.

The configuration of an IC card system which uses the above-described electronic wallet device 10 is described hereinafter in detail.

Referring first to FIG. 3, an example of the configuration of the IC card system according to the embodiment of the present invention is described. FIG. 3 is a block diagram showing an example of the configuration of a host device 20 and a non-contact type IC card 1 in the IC card system according to the embodiment.

As shown in FIG. 3, in the IC card system, the reader/writer 21 of the host device 20 transmits power to the non-contact type IC card 1 by generating a radio frequency (RF) operating magnetic field and further modulates the RF operating magnetic field according to a command or data. Non-contact communication is thereby performed between the reader/writer 21 and the non-contact type IC card 1. The communication may be "symmetric transmission" that does not use a subcarrier, which is performed at a transmission speed of 212 kbps with the use of a 13.56 MHz frequency band, for example. An amplitude shift keying (ASK) modulation may be used as a modulating method, and Manchester encoding may be used as an encoding method. Although a time slot method may be used as a method of detecting and avoiding data collision (anti-collision), for example, the IC card system does not necessarily support the anti-collision function. The IC card system repeats transactions in such a way that the reader/writer 21 of the host device 20 issues various kinds of commands to the non-contact type IC card 1, and the non-contact type IC card 1 responds to those commands, thereby performing communication regarding a prescribed service.

The configuration of the host device 20 is described below. The host device 20 includes a control section 22, a communication section 23, an antenna 24, a storing section 25, an operating section 26, an external interface 27 and so on. The control section 22, the communication section 23, the antenna 24 and so on constitute the reader/writer 21.

The control section 22 is configured of a micro-processor or the like, and it controls each section of the host device 20 and performs prescribed processing. The control section 22 operates according to a program which is stored in the storing section 25, and executes possessing concerning a prescribed service, generation of commands and control of transmission and reception of information, for example. The reader/writer 21 can thereby perform card detection (polling), mutual authentication, data reading and writing and so on for the non-contact type IC card 1.

The communication section 23 performs non-contact communication with the non-contact type IC card 1 using the antenna 24 according to a direction from the control section 22. Specifically, the communication section 23 generates an RF operating magnetic field using the antenna 24 and transmits power to the non-contact type IC card 1 through the RF operating magnetic field, and further modulates the RF operating magnetic field according to a command or data concerning a prescribed service and transmits the command or data to the non-contact type IC card 1. Further, the communication section 23 demodulates the RF operating magnetic field which is transmitted from the non-contact type IC card 1, obtains a command or data that is sent from the non-contact type IC card 1, and outputs them to the control section 22.

The antenna 24 is an antenna to communicate with the non-contact type IC card 1, and it is configured of a coil antenna, for example. The antenna 24 is connected with the communication section 23.

The storing section 25 is configured of a storage device such as a read only memory (ROM), a random access memory (RAM) or a hard disk drive, and it and stores information permanently or temporarily. The storing section 25 stores various kinds of data such as a program for causing the control section 22 to operate so as to provide a prescribed service by non-contact communication, a code (a service code, a system code etc.) that represents a service to which the reader/writer 21 corresponds, data that is acquired from the non-contact type IC card 1, data that is processed by the control section 22, and data that is input from the operating section 26 or the external interface 27, for example.

The operating section 26 is configured of an input device such as operation key and a display device such as a display, for example, and a user can operate the host device 20 and check displayed information using the operating section 26. The external interface 27 is a device for exchanging information with an external device (not shown) which is connected to the host device 20 through a network.

The configuration of the non-contact type IC card 1 is described hereinbelow. The non-contact type IC card 1 includes a control section 12, a communication section 13, an antenna 14, a storing section 15 and so on. The control section 12, the communication section 13 and the storing section 15 are mounted on a small IC chip. The antenna 14 is configured of a coil antenna which is located along the periphery of the non-contact type IC card 1 or the like, and it is connected with the communication section 13.

The control section 12 is configured of a micro-processor or the like, and it controls each section of the non-contact type IC card 1 and performs prescribed processing. The control section 12 operates according to a program such as an application program which is stored in the storing section 15, and executes prescribed processing, generation of commands, control of transmission and reception of information and so on. For example, when the control section 12 communicates with the reader/writer 21 concerning a prescribed service, the control section 12 can read or write data concerning the service (service data) from or to the storing section 15.

The communication section 13 performs non-contact communication with the reader/writer 21 of the host device 20 using the antenna 14 according to a direction from the control section 12. Specifically, the communication section 13 is configured of a front-end circuit, a power reproduction circuit or the like, which is not shown, and it supplies power and data obtained from the reader/writer 21 to the control section 12. The power reproduction circuit generates an induced electromotive force from the RF operating magnetic field of a carrier wave which is generated by the reader/writer 21 and takes it in as power of the non-contact type IC card 1, using the antenna 14. The induced electromotive force is used as a power source to drive each element of the non-contact type IC card 1. The front-end circuit receives the carrier wave which is emitted from the reader/writer 21 using the antenna 14, acquires a command or data from the reader/writer 21 by demodulating the carrier wave, and supplies the command or data to the control section 12. Further, the communication section 13 reproduces a clock for driving the non-contact type IC card 1 by dividing the frequency of the carrier wave. Furthermore, the communication section 13 modulates the carrier wave according to the command or data concerning a prescribed service which is generated by the control section 12 and transmits the modulated carrier wave to the reader/writer 21 using the antenna 14.

The storing section 15 is configured of a memory such as ROM or RAM and stores various kinds of information. For example, the storing section 15 may be configured of a semiconductor memory such as an electrically erasable and programmable ROM (EEPROM), a flash memory or a ferroelectric RAM (FeRAM). The storing section 15 stores various kinds of data such as an application program to cause the control section 12 to operate so as to provide a prescribed service by non-contact communication, a card ID to uniquely identify the non-contact type IC card 1, a code (a service code, a system code etc.) that represents a service to which the non-contact type IC card 1 corresponds, and service data such as data acquired from the reader/writer 21 and data processed by the control section 12, for example.

If the non-contact type IC card 1 is a multi-application card which corresponds to a plurality of services, the storing section 15 stores a plurality of kinds of codes, application programs, service data and so on which correspond to the respective services.

In such a configuration, the reader/writer 21 of the host device 20 and the non-contact type IC card 1 perform non-contact communication, thereby providing services using the non-contact type IC card 1 to a user. Although the non-contact type IC card 1 is capable of performing non-contact communication directly with the reader/writer 21 as shown in FIG. 3, it can communicate with the reader/writer 21 indirectly through the electronic wallet device 10 in the state that the non-contact type IC card 1 is contained in the electronic wallet device 10. In other words, the electronic wallet device 10 has a function to mediate non-contact communication between a plurality of non-contact type IC cards 1 and the reader/writer 21.

Referring then to FIG. 4, the configuration of the electronic wallet device 10 according to the embodiment of the present invention is described hereinafter. FIG. 4 is a block diagram showing the schematic configuration of the electronic wallet device 10 according to this embodiment.

As shown in FIG. 4, the electronic wallet device 10 mainly includes a casing 101, a holding section 102, an operating section 103, a display section 104, a control section 105, a storing section 106, an external communication antenna 107, a selector 108, card communication antennas 109A to 109C, a shield 110, a positioning sensor 111, and a positioning antenna 112.

The casing 101 of the electronic wallet device 10 includes the holding section 102 to hold a plurality of non-contact type IC cards 1. The holding section 102 is composed of the above-described plurality of slots 102A to 102C (cf. FIG. 1), for example, and stably holds the plurality of (e.g. three in the example FIG. 4) non-contact type IC cards 1A to 1C which are inserted through card insertion openings of the casing 101. The holding section 102 is sectionalized into holding areas (i.e. the slots 102A to 102C) which correspond to each non-contact type IC card 1, and the holding areas respectively include the card communication antennas 105A to 105C (which are also referred to collectively as the card communication antennas 105).

The card communication antenna 109 is an antenna for performing non-contact communication with each non-contact type IC card 1 which is held in the holding section 102. The card communication antenna 109 is configured of a coil antenna, for example, and it is connected to the selector 108. A plurality of card communication antennas 109 are placed corresponding one-to-one to each non-contact type IC card 1 which is held in the holding section 102, and they are positioned opposite to each non-contact type IC card 1. Thus, each card communication antenna 109 can individually perform non-contact communication with each non-contact type IC card 1 which is held in the holding section 102. Further, the card communication antennas 109 are connected to the external communication antenna 107 and the control section 105 via the selector 108, so that they can exchange data to be read from or written to the storing section 15 in the non-contact type IC card 1 with the reader/writer 21 or the control section 105.

Further, the holding section 102 has the shield 110 so as to separate the plurality of non-contact type IC cards 1 which are held therein from each other. The shield 110 is made of a material which shields an electromagnetic wave and has a shape that individually surrounds each non-contact type IC card 1 held in the holding section 102. The shield 110 electromagnetically isolates the plurality of non-contact type IC cards 1 in the holding section 102 from each other, thereby avoiding mutual interference. It is thereby possible to prevent the antenna coils of the adjacent non-contact type IC cards 1 from magnetically coupling with each other so as to eliminate an influence caused by electromagnetic induction of another non-contact type IC card 1 or the like. Therefore, one non-contact type IC card 1 which is selected from a plurality of non-contact type IC cards 1 in the holding section 102 can suitably communicate with the reader/writer 21 without being interfered by the other non-contact type IC cards 1.

As described above, the holding section 102 includes a plurality of card communication antennas 105 which respectively correspond to a plurality of non-contact type IC cards 1 and the shield 110 which electromagnetically isolates the plurality of non-contact type IC cards 1 from each other. Therefore, even when a plurality of non-contact type IC cards 1 which do not support anti-collision are held in the holding section 102, each non-contact type IC card 1 can perform communication individually. However, the present invention is not limited to such an example, and in the case of holding only the non-contact type IC cards 1 which support the anti-collision function, the shield 110 may be eliminated, and the holding section 102 may include a single card communication antenna 109 which is commonly used for all the non-contact type IC cards 1.

The operating section 103 is configured of an operating key such as a button, a lever and a touch panel, for example. A user can direct the operation of the electronic wallet device 10 or input data by operating the operating section 103. The display section 104 is configured of a display device such as a liquid crystal display device. The display section 104 displays various kinds of information concerning services using the non-contact type IC cards 1. For example, the display section 104 can display a type of the non-contact type IC card 1 which is held in the holding section 102, card inside information such as service data that is stored in the cards 1 (e.g. a balance of electronic value), and so on.

The control section 105 is configured of a micro processor which is mounted on an IC chip, for example. The control section 105 controls each section of the electronic wallet device 10 and performs prescribed processing. The control section 105 operates according to a program which is stored in the storing section 106 and executes processing concerning a prescribed service, generation of commands, control of transmission and reception of various kinds of information and so on. The electronic wallet device 10 can thereby perform transaction processing for the non-contact type IC card 1 such as card detection (polling), mutual authentication and data reading and writing with the reader/writer 21. Further, the control section 105 serves as a card selecting section which selects a card to be used for communication with the reader/writer 21 from a plurality of non-contact type IC cards 1 that are stored in the holding section 102 by sequentially applying a plurality of kinds of card selection criteria. The detail of the function of the control section 105, including the card selection function, is described later (cf. FIG. 5).

The storing section 106 is configured of a memory such as ROM or RAM and stores various kinds of information. For example, the storing section 106 may be configured of a semiconductor memory such as EEPROM, a flash memory or FeRAM. The storing section 106 stores various kinds of program for causing the control section 105 to operate and various kinds of data such as data acquired from the reader/writer 21 during communication between the reader/writer 21 and the non-contact type IC card 1 and data processed by the control section 105, for example. Further, the storing section 106 stores various kinds of data to be used for selection of the non-contact type IC card 1 by the control section 105, which is described in detail later (cf. FIG. 5).

The external communication antenna 107 is an antenna by which the electronic wallet device 10 performs non-contact communication with an external unit such as the reader/writer 21 of the host device 20, and it is configured of a coil antenna, for example. The external communication antenna 107 is connected to the control section 105 and the card communication antennas 109 via the selector 108. The external communication antenna 107 receives a carrier wave which is emitted from the reader/writer 21 and outputs a signal corresponding to the carrier wave to the control section 105 via the selector 108 or outputs it to the non-contact type IC card 1 via the selector 108 and the card communication antenna 109. Further, the external communication antenna 107 transmits a carrier wave corresponding to a signal which is output from the control section 105 or the non-contact type IC card 1 to the reader/writer 21.

The selector 108 is a switching circuit, which is connected to the external communication antenna 107, the control section 105 and the card communication antennas 109. The selector 108 has a function of selectively switching the non-contact type IC cards 1 to be used for communication with the reader/writer 21. Specifically, the selector 108 connects the card communication antenna 109 which corresponds to one non-contact type IC card 1 that is selected from a plurality of non-contact type IC cards 1 which is held in the holding section 102 to the external communication antenna 107 so as to enable communication with each other based on a direction from the control section 105. For example, if the non-contact type IC card 1A is selected by the control section 105, the selector 108 connects the card communication antenna 109A to the external communication antenna 107. The non-contact type IC card 1A thereby becomes non-contact communicable with the reader/writer 21 via the card communication antenna 109A, the selector 108 and the external communication antenna 107. In this manner, the non-contact type IC card 1 which is held in the electronic wallet device 10 communicates with the reader/writer 21 via the card communication antenna 109 that corresponds to itself and the external communication antenna 107 that is common to all cards.

The positioning sensor 111 serves as a positioning section which detects current location of the electronic wallet device 10. The positioning sensor 111 is connected with a positioning antenna 112 which is placed in the electronic wallet device 10. The positioning sensor 111 receives a radio wave which is emitted from an emitter 31 via the positioning antenna 112 and performs prescribed processing based on the received radio wave, thereby detecting the current location of the electronic wallet device 10. The positioning sensor 11 1, the positioning antenna 112 and the emitter 31 constitute a positioning system 30.

A typical example of the positioning system 30 is a global positioning system (GPS) which performs positioning using radio waves from satellites, which are the emitter 31. In the case of using GPS, the positioning sensor 111 serves as a GPS receiver, which receives radio waves from a plurality of GPS satellites using the positioning antenna 112 and calculates a distance from each GPS satellite to thereby measure the current location of the electronic wallet device 10. The positioning system 30, however, is not limited to the example of the GPS system, and it may be (1) a positioning system which retrieves current location information without connection with the internet, using radio wave information of wireless LAN that is acquired by detecting the locations of surrounding access points and database that is accumulates radio wave information of the wireless LAN and location information in association with each other (e.g. "PlaceEngine"), (2) a positioning system which measures current location based on the locations of base stations of a mobile phone, or (3) a positioning system which measures current location based on the frequency of a received radio wave such as AM or FM radio wave, for example.

The positioning sensor 111 provides the current location information of the electronic wallet device 10 which is measured as above to the control section 105. The control section 105 can thereby select an appropriate non-contact type IC card 1 which corresponds to a service area from a plurality of non-contact type IC cards 1 based on the current location information which is acquired from the positioning sensor 111.

The schematic configuration of the electronic wallet device 10 according to the embodiment is described in the foregoing with reference to FIG. 4. In the electronic wallet device 10 of this embodiment, an appropriate card to be used for communication with the reader/writer 21 is selected from a plurality of non-contact type IC cards by applying a plurality of card selection criteria in combination. The card selection function is described hereinafter in detail.

Figure 5:
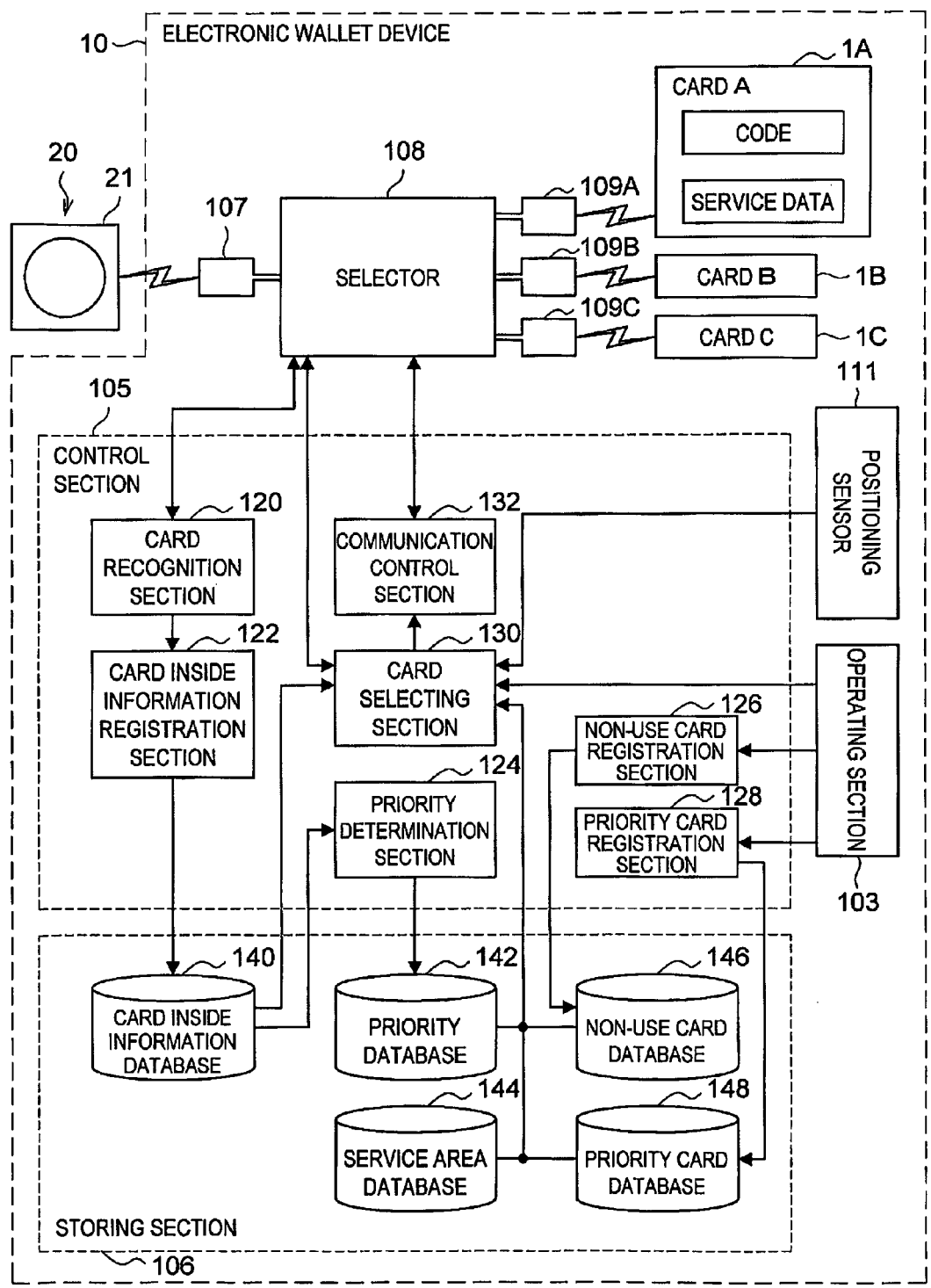
FIG. 5 is a functional block diagram showing a functional configuration of the electronic wallet device according to the embodiment.

Referring first to FIG. 5, the functional configuration of the electronic wallet device 10 according to this embodiment is described hereinbelow. FIG. 5 is a functional block diagram showing the functional configuration of the electronic wallet device 10 of the embodiment.

As shown in FIG. 5, the control section 105 of the electronic wallet device 10 functions as a card recognition section 120, a card inside information registration section 122, a priority determination section 124, a non-use card registration section 126, a priority card registration section 128, a card selecting section 130, and a communication control section 132. Further, the storing section 106 stores a card inside information database 140, a priority database 142, a service area database 144, a non-use card database 146 and a priority card database 148. Each section is described in detail hereinbelow.

The card recognition section 120 recognizes the non-contact type IC card 1 which is held in the holding section 102 of the electronic wallet device 10. Specifically, the card recognition section 120 recognizes whether the non-contact type IC card 1 is held in each slot 102A to 102C by detecting the insertion of the non-contact type IC cards 1A to 1C into the respective slots 102A to 102C or the removal of the non-contact type IC cards 1A to 1C from the respective slots 102A to 102C. Further, the card recognition section 120 determines the kind of the non-contact type IC card 1 which is held in each of the slots 102A to 102C by reading out identification information such as a code (e.g. a service code, a system code etc.) or a card ID from the non-contact type IC card 1 which is held in the slots 102A to 102C. The code is information which represents the kind of a service to which the non-contact type IC card 1 corresponds, which is, the kind of the non-contact type IC card 1. The card recognition section 120 can determine whether a plurality of non-contact type IC cards 1 are the same kind of cards or different kinds of cards based on the code which is stored in each non-contact type IC card 1. In this manner, the card recognition section 120 previously recognizes the non-contact type IC cards 1 which are held in the holding section 102, thereby allowing selection of the non-contact type IC card 1 to be used for communication with the reader/writer 21 as described below.

Further, the card inside information registration section 122 registers or updates information related to the non-contact type IC card 1 which is held in the holding section 102 onto the card inside information database 140 of the storing section 106. The card inside information registration section 122 may execute the registration/update operation triggered by the insertion/removal of the non-contact type IC cards 1 to/from the holding section 102, or may execute the registration/update operation regularly after holding each card.

Specifically, when the non-contact type IC card 1 is inserted into the holding section 102, for example, the card inside information registration section 122 reads out information which is stored in the non-contact type IC card 1 that is held in the holding section 102 (which is referred to hereinafter as card inside information) and registers the card inside information onto the card inside information database 140 of the storing section 106. For example, the card inside information is a code related to a service to which the non-contact type IC card 1 corresponds (e.g. a service code, a system code), service data, and so on. The service data is information which indicates a content of a service which is stored in the non-contact type IC card 1, which may be (1) electronic value stored in an electronic money card (e.g. the amount of money, points or coupons charged in a card), (2) data of a commuter pass, a reserved-seat ticket or a balance of a prepaid fare stored in a transportation card, (3) personal authentication information of an identification card or (4) ticket data of an electronic ticket card, for example.

Further, when the non-contact type IC card 1 is removed from the holding section 102, for example, the card inside information registration section 122 deletes the card inside information of the non-contact type IC card 1 from the card inside information database 140. Furthermore, when the non-contact type IC card 1 is used and the service data in this card is changed, for example, the card inside information registration section 122 updates the service data of the relevant non-contact type IC card 1 in the card inside information database 140.

The priority determination section 124 sets priorities of the non-contact type IC card 1 to be used for communication with the reader/writer 21 for each service based on the card inside information of the plurality of non-contact type IC cards 1 which are held in the holding section 102. Further, the priority determination section 124 registers the determined priorities for each service onto the priority database 142. Specifically, the priority determination section 124 reads out the card inside information of each non-contact type IC card 1 from the card inside information database 140 and sets priorities of the non-contact type IC cards 1 for each service by applying a predetermined priority determination criterion to the service data which is contained in the card inside information. For example, in the case of an electronic money service, the priority determination section 124 sets a higher priority to the non-contact type IC card 1 (electronic money card) which has a larger/smaller amount (balance) of electronic value charged therein and registers it onto a priority table for electronic money service in the priority database 142. In the case of a service for transportation, the priority determination section 124 sets a higher priority to the non-contact type IC card 1 which stores a commuter pass over the non-contact type IC card 1 which stores a prepaid fare among a plurality of non-contact type IC cards 1 (transportation cards) and registers it onto a priority table for transportation service in the priority database 142.

The non-use card registration section 126 registers non-use card information which indicates a non-use card that is designated by a user of the electronic wallet device 10 onto the non-use card database 146 of the storing section 106. Specifically, a user of the electronic wallet device 10 designates a card that is not to be used for communication with the reader/writer 21 (a non-use card) among the plurality of non-contact type IC cards 1 which are held in the electronic wallet device 10 by manipulating the operating section 103 of the electronic wallet device 10. The non-use card registration section 126 reads out identification information (e.g. a card ID) of the non-use card which is designated by a user from the card and registers it onto the non-use card database 146.

The priority card registration section 128 registers priority card information which indicates a priority card that is designated by a user of the electronic wallet device 10 onto the priority card database 148 of the storing section 106. Specifically, a user of the electronic wallet device 10 designates a card that is to be preferentially used for communication with the reader/writer 21 (priority card) among the plurality of non-contact type IC cards 1 which are held in the electronic wallet device 10 by manipulating the operating section 103 of the electronic wallet device 10. The priority card registration section 128 reads out identification information (e.g. a card ID) of the priority card which is designated by a user from the card and registers it onto the priority card database 148.

The card selecting section 130 selects a card that is to be used for communication with the reader/writer 21 from the plurality of non-contact type IC cards which are held in the holding section 102. The card selection processing is performed when receiving a communication request concerning a prescribed service from the reader/writer 21 of the host device 20 via the external communication antenna 107 (e.g. upon start of a transaction between the reader/writer 21 and the electronic wallet device 10), or performed in advance before receiving the communication request. In the card selection processing, the card selecting section 130 narrows down the candidates of the non-contact type IC card 1 to be used for communication with the reader/writer 21 of the host device 20 (which is referred to hereinafter as the candidate cards) from the plurality of non-contact type IC cards by sequentially applying a plurality of predetermined different card selection criteria. Then, eventually, the card selecting section 130 selects one non-contact type IC card 1 to be used for communication with the reader/writer 21.

In this manner, the card selecting section 130 automatically selects a card to be used for communication with the reader/writer 21 by combining a plurality of card selection criteria. For example, the card selection criteria may be (a) a selection criterion based on an available area, (b) a selection criterion based on a code received from the reader/writer 21, (c) a selection criterion based on card inside information stored in each non-contact type IC card 1, (d) a selection criterion based on a non-use card designated by a user, (e) a selection criterion based on a priority card designated by a user and so on. Those card selection criteria are described hereinbelow.

(a) Card Selection Criterion Based on an Available Area

The card selecting section 130 selects the non-contact type IC card 1 based on the current location information that is acquired from the positioning sensor 111 of the positioning system 30 and the service area information that is read out from the service area database 144 of the storing section 106. The storing section 106 of the electronic wallet device 10 previously stores the service area database 144 which defines service area information where each service is provided for respective services. The service area information is information which indicates a domestic or foreign area (service area) where each non-contact type IC card 1 is applicable.

For some services which are provided by means of the non-contact type IC card 1, the area where the service is applicable is limited. For example, in the case of a transportation card, there are a card which is available in the transportation of the eastern Japan (e.g. the card "Suica" of which service area is Kanto region) and a card which is available in the transportation of the western Japan (e.g. the card "Icoka" of which service area is Kansai region). In case of an electronic money card, there is a card which is available only within the country (e.g. Japan) and not available outside the country and a card which is available in both within and outside the country. The non-contact type IC card 1 with such regional limitation is only available for the host device 20 which is located in the corresponding service area. The service area information is information which sets a service area where the non-contact type IC card 1 is applicable for each kind of the non-contact type IC card 1 (i.e. for each service), which is previously stored in the storing section 106 of the electronic wallet device 10.

On the other hand, the electronic wallet device 10 can acquire the current location information of the electronic wallet device 10 from the positioning sensor 111 of the positioning system 30 as described above. The card selecting section 130 compares the acquired current location information with the service area information that is read out from the service area database 144 to thereby identify the non-contact type IC card 1 which applies to the service area where the current location of the electronic wallet device 10 is included. Accordingly, the card selecting section 130 can select the non-contact type IC card 1 which is available in the current location of the electronic wallet device 10 as a candidate card from the plurality of non-contact type IC cards 1 that are held in the holding section 102.

(b) Card Selection Criterion Based on a Code Transmitted from the Reader/writer 21

In the IC card system, a service which is implemented by non-contact communication between the reader/writer 21 and the non-contact type IC card 1 can be identified by a code that is included in a communication request from the host device 20 (e.g. a system code or a service code representing a service provided by the host device 20). At an early stage of non-contact communication, the reader/writer 21 emits a communication request (request command) which includes the pertinent code and detects whether the non-contact type IC card 1 which corresponds to the service exists within a communication area of the reader/writer 21 (which is called polling). The card selecting section 130 selects the non-contact type IC card 1 which is appropriate for the code that is included in the communication request from the reader/writer 21.

Specifically, upon receiving a communication request which includes a code related to a prescribed service from the host device 20 via the external communication antenna 107, the card selecting section 130 reads out the code of a service to which the non-contact type IC card 1 held in the holding section 102 corresponds from the card inside information database 140 of the storing section 106. Then, the card selecting section 130 compares the received code against the read-out code to thereby identify the non-contact type IC card 1 which is applicable to the service for which the communication request is made by the reader/writer 21. Accordingly, the card selecting section 130 can select the non-contact type IC card 1 which can be used for the service for which the communication request is made as a candidate card from the plurality of non-contact type IC cards 1 that are held in the holding section 102.

(c) Card Selection Criterion Based on Card Inside Information Stored in each Non-contact Type IC Card 1

The electronic wallet device 10 copes with the case where a plurality of non-contact type IC cards 1 which apply to the same kind of services are held in the holding section 102, for example. For instance, a user holds a plurality of the same kind of transportation cards or a plurality of the same kind of electronic money cards in the electronic wallet device 10 in some cases. In such case where the same kind of cards are held in the electronic wallet device 10 as well, the card selecting section 130 can select a candidate card based on card inside information which is stored in each non-contact type IC card 1 held in the holding section 102.

As described above, the priorities for card selection are previously set by the priority determination section 124 based on the card inside information which is stored in each non-contact type IC card 1 and stored in the priority database 142. The card selecting section 130 selects the non-contact type IC card 1 to be used for communication with the reader/writer 21 from the plurality of non-contact type IC cards 1 which are held in the holding section 102 based on the information indicating the priorities that are set by the priority determination section 124 (which is referred to hereinafter as the priority information).

Specifically, the card selecting section 130 reads out priority information from the priority database 142 and selects the non-contact type IC card 1 of which order of priority indicated by this priority information is high as a candidate card. For example, in the case of selecting a card to be used for communication with the reader/writer 21 from a plurality of electronic money cards, the card selecting section 130 preferentially selects the electronic money card which stores large/small amount of electronic value as a candidate card according to the priority information. In the case of selecting a transportation card, the card selecting section 130 preferentially selects the transportation card which stores commuter pass data.

(d) Card Selection Criterion Based on a Non-use Card Designated by a User

In the non-use card database 146, identification information of a non-use card which is designated by a user is registered. The card selecting section 130 can thereby identify the non-use card which is designated by a user by reading out the identification information of the non-use card from the non-use card database 146. Thus, at the time of card selection, the card selecting section 130 selects the non-contact type IC card 1 to be used for communication with the reader/writer 21 by excluding the non-use cards which are registered on the non-use card database 146 from candidate cards. It is thereby possible to avoid that the electronic wallet device 10 automatically selects and uses the non-contact type IC card 1 which a user does not wishes to use.

(e) Card Selection Criterion Based on a Priority Card Designated by a User

In the priority card database 148, identification information of a priority card which is designated by a user or priority information of the priority card are registered. The card selecting section 130 can thereby identify the priority card which is designated by a user and know its order of priority by reading out the identification information or the priority information of the priority card from the priority card database 148. Thus, at the time of card selection, the card selecting section 130 preferentially selects the priority card which is registered on the priority card database 148 as a candidate card. It is thereby possible to preferentially select and use the non-contact type IC card 1 which a user wishes to use by priority.

The examples of the plurality of card selection criteria (a) to (e) are described in the foregoing. The card selecting section 130 narrows down candidate cards to be used for communication with the reader/writer 21 by sequentially applying the card selection criteria (a) to (e) in combination to thereby automatically select an appropriate non-contact type IC card 1. Therefore, even if a plurality of non-contact type IC cards 1 concerning the same or different kinds of services are held in the electronic wallet device 10, it is possible to select the non-contact type IC card 1 which is appropriate for communication with the reader/writer 21.

Further, the card selecting section 130 may sequentially apply the plurality of card selection criteria (a) to (e) in combination in the sequence which corresponds to prescribed priorities which are set for each kind of services. For example, in case of a transportation service, the card selecting section 130 may apply the card selection criterion (b) based on a code firstly, then apply the card selection criterion (a) based on an available area, and finally apply the card selection criterion (c) based on card inside information. In terms of data processing efficiency, the card selection criteria to be applied or their sequence differ by the kind of service. Accordingly, the card selecting section 130 can efficiently execute the card selection processing according to the kind of service by previously setting the priorities of the card selection criteria to be applied for each service and storing them in the storing section 106.

Furthermore, the card selecting section 130 may make a choice of the plurality of card selection criteria according to a cord (e.g. a system code or a service code indicating a service provided by the host device 20) which is contained in a communication request (request command) that is transmitted from the reader/writer 21 during polling operation. The card selecting section 130 can thereby execute the card selection processing by selectively using an appropriate card selection criterion corresponding to a service from the plurality of card selection criteria (a) to (e). For example, in the case of an electronic money service with no regional limitation, the card selection criterion (a) based on an available area is unnecessary, and therefore card selection processing may be executed by applying the other selection criteria (b) to (e) and so on according to need. It is thereby possible to eliminate the processing using unnecessary card selection criterion depending on the kind of service, which enables efficient and rapid card selection processing.

The card selecting section 130 has a manual selection function in addition to the automatic selection function described above. In the manual selection, the above-described automatic selection is not performed, and the card selecting section 130 selects the non-contact type IC card 1 which is selected manually by a user with the operating section 103 as a non-contact type IC card 1 to be used for communication with the reader/writer 21. Based on a user input, the electronic wallet device 10 can be set to either one of the automatic selection mode in which the electronic wallet device 10 automatically selects a card or the manual selection mode in which a user manually selects a card.

The communication control section 132 connects the non-contact type IC card 1 which is selected by the card selecting section 130 and the reader/writer 21 of the host device 20 via the external communication antenna 107 and the card communication antenna 109 by controlling the selector 108 so that the selected non-contact type IC card 1 and the reader/writer 21 communicate with each other. For example, when the card A is selected from the non-contact type IC cards 1A to 1C by the card selecting section 130, the communication control section 132 directs the selector 108 to connect the card communication antenna 109A with the external communication antenna 107. In response thereto, the selector 108 connects the non-contact type IC card 1A with the reader/writer 21 via the card communication antenna 109A and the external communication antenna 107 so that the non-contact type IC card 1A and the reader/writer 21 communicate with each other. Consequently, commands and data concerning a prescribed service can be exchanged between the non-contact type IC card 1A and the reader/writer 21.

As described above, the communication control section 132 connects only one non-contact type IC card 1 selected by the card selecting section 130 from a plurality of non-contact type IC cards 1 held in the holding section 102 with the reader/writer 21 so as to communicate therewith. It is thereby possible to avoid that communication is disabled due to that a plurality of non-contact type IC cards 1 simultaneously respond to a communication request from the reader/writer 21 even when the same kind of non-contact type IC cards 1 that do not support anti-collision are held. Therefore, even if a plurality of non-contact type IC cards 1 in the electronic wallet device 10 exist within a communication area of the reader/writer 21 all at once, only one appropriate non-contact type IC card 1 communicates with the reader/writer 21 to thereby implement a service desired by a user.

Further, the communication control section 132 serves as a communication section which controls communication between the electronic wallet device 10 and the reader/writer 21. The electronic wallet device 10 can thereby communicates with the reader/writer 21 and exchange various kinds of commands or data via the external communication antenna 107.

The configuration of the electronic wallet device 10 according to the present embodiment is described in the foregoing. The functional portions of the control section 105 shown in FIG. 5 may be implemented by installing program for executing each function on the electronic wallet device 10 or by mounting dedicated hardware.

Figure 6:
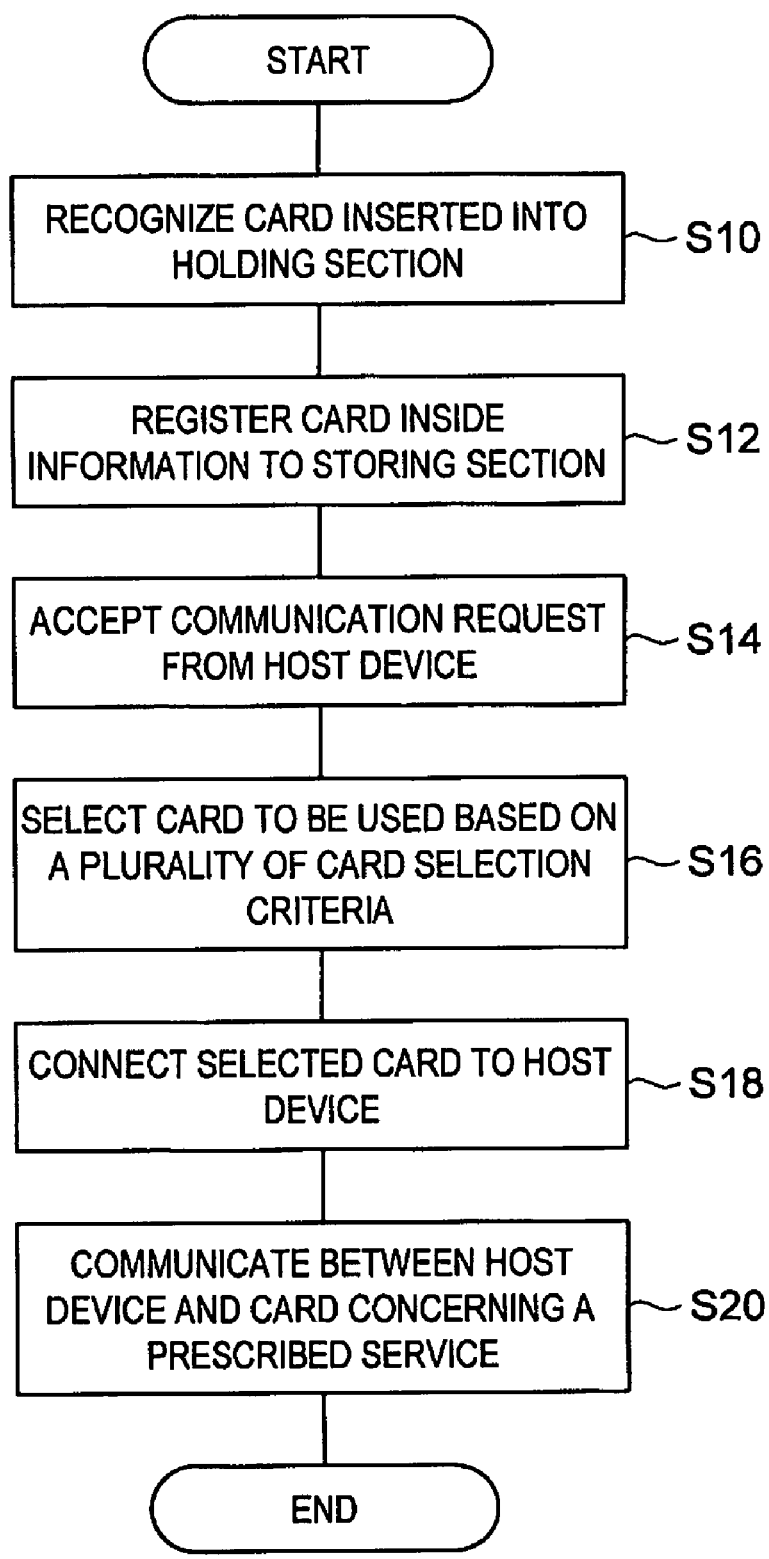
FIG. 6 is a flowchart showing a communication method using the electronic wallet device according to the embodiment.

Referring then to FIG. 6, a communication method using the electronic wallet device 10 is described hereinafter. FIG. 6 is a flowchart showing the communication method using the electronic wallet device 10 according to the embodiment of the present invention.

As shown in FIG. 6, when the non-contact type IC card 1 is inserted into the holding section 102 of the electronic wallet device 10, the control section 105 of the electronic wallet device 10 recognizes the inserted non-contact type IC card 1 (step S10). Next, the control section 105 registers the card inside information (e.g. a card ID, a service code/a system code, service data etc.) which is stored in the recognized non-contact type IC card 1 onto the card inside information database 140 of the storing section 106 (step S12).

If a plurality of non-contact type IC cards 1 are inserted sequentially, the control section 105 repeats the card recognition processing and the card inside information registration processing in the steps S10 and S12, respectively. Further, if the non-contact type IC card 1 is removed from the holding section 102 of the electronic wallet device 10, the control section 105 eliminates the card inside information of the pertinent card from the storing section 106 and deletes the registration.

Then, the user holds the electronic wallet device 10 over the reader/writer 2 1 of the host device 20 so as to locate it within a communication area of the reader/writer 2 1, and the electronic wallet device 10 accepts a communication request from the reader/writer 21 of the host device 20 (step S14). The communication request is constantly emitted by the polling operation of the reader/writer 21, and it contains a code which indicates a service provided by the host device 20.

In response to the communication request, the control section 105 of the electronic wallet device 10 performs card selection processing based on a plurality of card selection criteria (step S16). The control section 105 narrows down candidate cards to be used for communication with the reader/writer 21 from which the communication request is made from a plurality of non-contact type IC cards 1 held in the holding section 102 by sequentially applying the above-described plurality of card selection criteria, and finally selects one non-contact type IC card 1. The detail of the card selection processing described later (cf. FIG. 7 to 13).

In the card selection processing, the electronic wallet device 10 does not necessarily apply all executable card selection criteria in prescribed sequence. For example, it is feasible to make a choice of a plurality of necessary card selection criteria according to a code which is contained in a communication request from the reader/writer 21 (i.e. a service provided by the reader/writer 21) and apply the chosen card selection criteria sequentially in the prescribed priorities appropriate for the service. The card selection processing using part of the card selection criteria may be performed before receiving a communication request from the reader/writer 21.

Further, the control section 105 of the electronic wallet device 10 connects the non-contact type IC card 1 which is selected in the step S16 to the reader/writer 21 of the host device 20 via the external communication antenna 107 and the card communication antenna 109 by controlling the selector 108 so that the selected non-contact type IC card 1 and the reader/writer 21 communicate with each other (step S18). The non-contact type IC card 1 which is selected in the above step among a plurality of non-contact type IC cards 1 that are surrounded by the shield 110 thereby becomes communicable with the reader/writer 21.

After that, commands or data concerning the prescribed service are exchanged by non-contact communication between the reader/writer 21 of the host device 20 and the selected non-contact type IC card 1 via the external communication antenna 107 and the card communication antenna 109 of the electronic wallet device 10 (step S20). Services such as trading of a product using electronic money, transportation ticket gate system, confirmation of electronic ticket and electronic settlement are thereby implemented.

In the communication method of the embodiment described above, even when a plurality of non-contact type IC cards 1 which do not support anti-collision are held in the electronic wallet device 10, the electronic wallet device 10 can automatically select an appropriate non-contact type IC card 1, so that only the selected non-contact type IC card 1 can communicate with the reader/writer 21 of the host device 20. It is thereby possible to avoid mutual interference of the plurality of non-contact type IC cards 1 in the electronic wallet device 10. Accordingly, a user can rapidly and easily receive services using each non-contact type IC card 1 even when the user carries a plurality of non-contact type IC cards 1 all together in the electronic wallet device 10.

Referring now to FIGS. 7 to 11, the card selection processing using the card selection criteria (a) to (e) are described hereinafter in detail.

Figure 7:
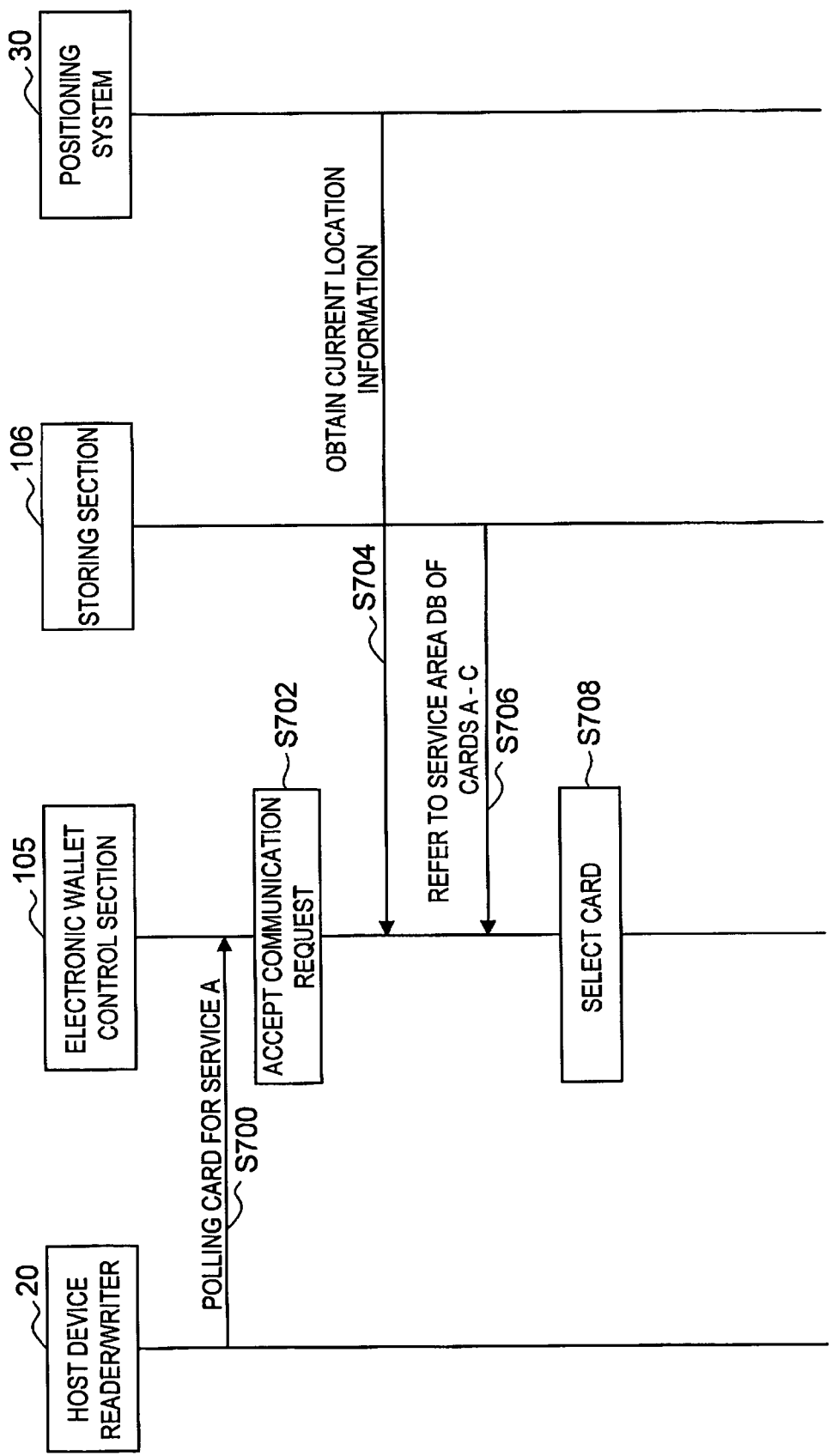
FIG. 7 is a sequence chart showing card selection processing based on an available area in the electronic wallet device according to the embodiment.

FIG. 7 is a sequence chart showing the card selection processing (a) based on an available area in the electronic wallet device 10 of the present embodiment.

As shown in FIG. 7, the reader/writer 21 of the host device 20 which corresponds to the service A performs polling of the non-contact type IC card 1 that corresponds to the service A at all times (step S700). Specifically, the reader/writer 21 continuously emits a communication request (request command) which requests a response from the non-contact type IC card 1 in order to detect whether the non-contact type IC card 1 which corresponds to the service A exists within its communication area. The request command is, for example, "REQC command" specified in JIS: X6319-4, and the "REQC command" includes a system code which indicates a service to which the reader/writer 21 corresponds.

During the polling, when a user holds the electronic wallet device 10 over the reader/writer 21, the electronic wallet device 10 accepts a communication request which is emitted from the reader/writer 21 (step S702). Upon accepting of the communication request, the electronic wallet device 10 performs the process of selecting the non-contact type IC card to be used for communication with the reader/writer 21 from a plurality of non-contact type IC cards 1A to 1C that are held in the holding section 102 (steps S704 to S708).

First, the control section 105 of the electronic wallet device 10 acquires current location information which indicates the current location of the electronic wallet device 10 from the positioning sensor 111 of the positioning system 30 (step S704). Further, the control section 105 reads out service area information which corresponds to a plurality of non-contact type IC cards 1A to 1C held in the holding section 102 from the service area database 144 of the storing section 106 (step S706).

Next, the control section 105 performs the card selection processing and thereby narrows down candidate cards based on the current location of the electronic wallet device 10 (step S708). Specifically, the control section 105 compares the current location information of the electronic wallet device 10 which is acquired in the step S704 with the service area information which is read out in the step S706 and determines whether the respective non-contact type IC cards 1A to 1C exist within the service area. As a result, the control section 105 excludes the non-contact type IC cards which exist outside the service area from candidate cards and selects the non-contact type IC cards which exist within the service area as candidate cards to be used for communication with the reader/writer 21.

If the current location information indicates outside of Japan, for example, the non-contact type IC cards 1B and 1C which are applicable to the service that is provided only in Japan are excluded from candidate cards, and the non-contact type IC card 1A which is applicable to the service that is provided outside Japan as well is selected as a candidate card. If the current location of the electronic wallet device 10 is Kansai districts, for example, the non-contact type IC card 1 of which service area is Kanto districts only is excluded from candidate cards.

In this manner, the electronic wallet device 10 can acquire its current location information and narrow down candidate cards to be used for communication with the reader/writer 21 to the cards which correspond to the acquired current location from a plurality of non-contact type IC cards 1.

Figure 8:
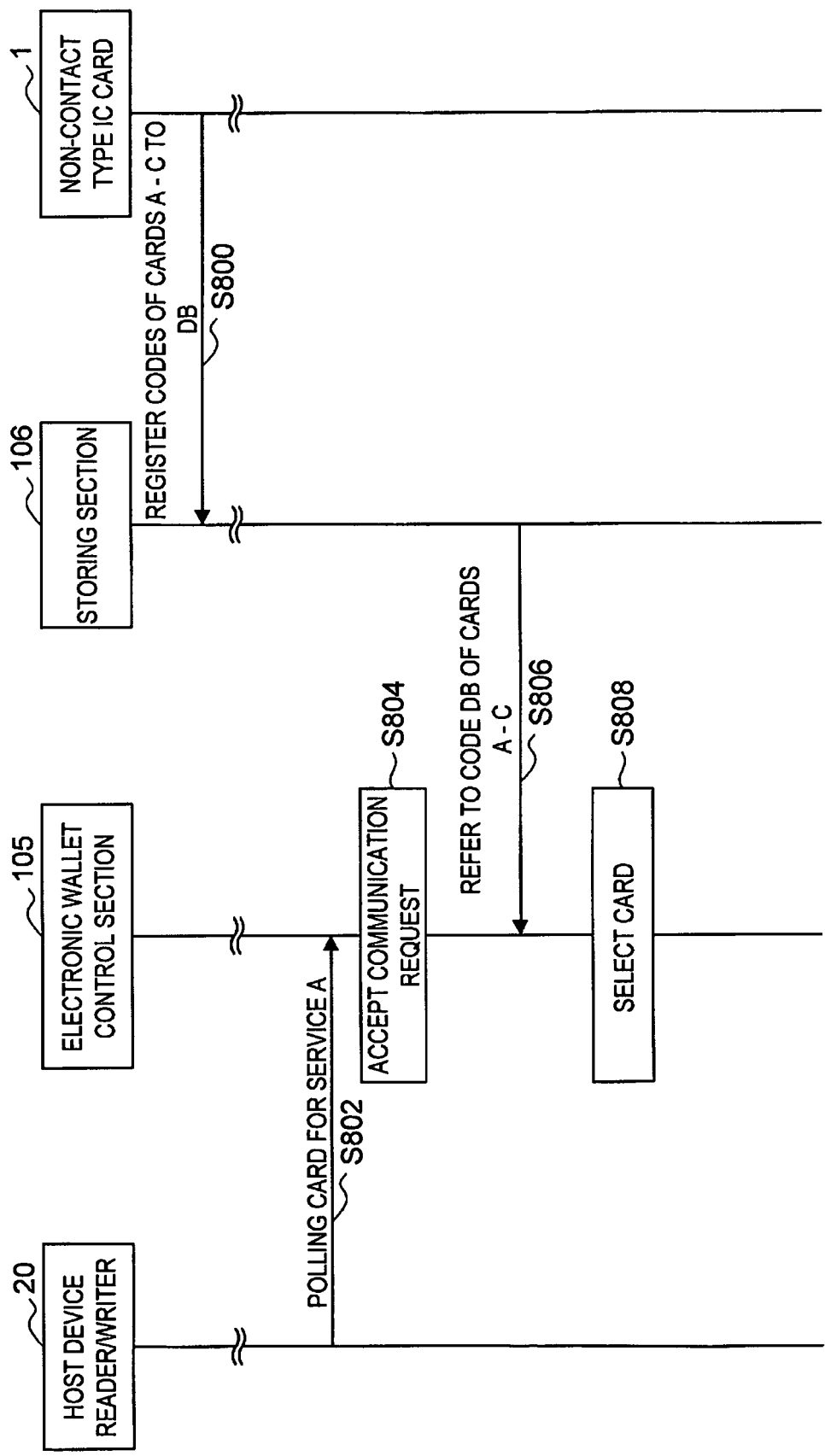
FIG. 8 is a sequence chart showing card selection processing based on a code transmitted from a reader/writer in the electronic wallet device according to the embodiment.

FIG. 8 is a sequence chart showing the card selection processing (b) based on a code transmitted from the reader/writer 21 in the electronic wallet device 10 of the present embodiment.

As shown in FIG. 8, when the non-contact type IC cards 1A to 1C are inserted into the holding section 102 of the electronic wallet device 10, the control section 105 of the electronic wallet device 10 recognizes the inserted non-contact type IC cards 1A to 1C, reads out the code (e.g. a system code, a service code etc.) that is stored in the respective non-contact type IC cards 1A to 1C and registers them onto the card inside information database 140 in the storing section 106 (step S800). Because such code registration processing is performed sequentially at the time when the non-contact type IC cards 1A to 1C are inserted, service codes to which the respective cards 1A to 1C correspond can be registered in advance before performing the card selection processing.

On the other hand, the reader/writer 21 of the host device 20 which corresponds to the service A performs polling of the non-contact type IC card 1 that corresponds to the service A at all times (step S802). If a user holds the electronic wallet device 10 over the reader/writer 21 during the polling, the electronic wallet device 10 accepts a communication request (e.g. "REQC command" specified in JIS: X6319-4) which is emitted from the reader/writer 21 (step S804). Upon accepting of the communication request, the control section 105 of the electronic wallet device 10 determines whether the plurality of non-contact type IC cards 1A to 1C held in the holding section 102 correspond to the code which is contained in the received communication request and carries out the processing of selecting the corresponding non-contact type IC card 1 (steps S806 to S808).

Specifically, the control section 105 of the electronic wallet device 10 first reads out the codes corresponding to the plurality of non-contact type IC cards 1A to 1C which are held in the holding section 102 from the card inside information database 140 of the storing section 106 (step S806).

Next, the control section 105 executes the card selection processing and narrows down candidate cards based on the code transmitted from the reader/writer 21 (step S808). Specifically, the control section 105 checks the code which is contained in the request command that is acquired from the reader/writer 21 in the step S804 against the codes of the non-contact type IC cards 1A to 1C which are read out in the step S808 and determines whether the respective cards 1A to 1C correspond to the code contained in the request command. As a result, the non-contact type IC cards 1 which does not correspond to the code is excluded from candidate cards to be used for communication with the reader/writer 21, and the non-contact type IC card 1 which corresponds to the code is selected as a candidate card.

For example, in the case where the "REQC command" is received from the reader/writer 21, if a system code contained in the "REQC command" is "0x0003", it means that a communication request concerning a transportation card is received. Accordingly, the electronic wallet device 10 excludes all the cards other than the transportation card corresponding to the system code "0x0003" from candidate cards.

In this manner, based on the code which is contained in a communication request from the reader/writer 21, the electronic wallet device 10 can narrow down candidate cards to be used for communication with the reader/writer 21 to the cards corresponding to the code.

Figure 9:
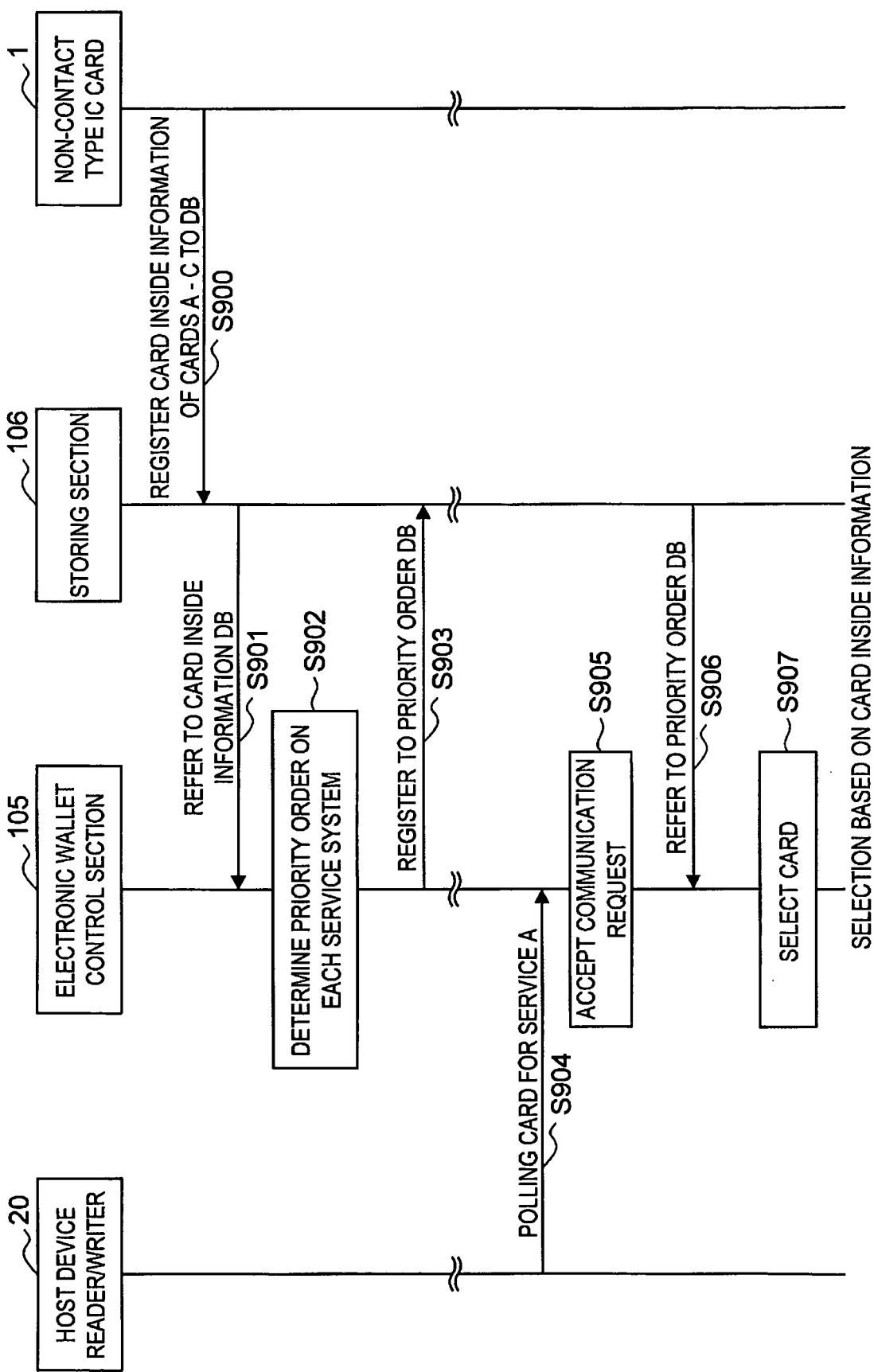
FIG. 9 is a sequence chart showing card selection processing based on card inside information in the electronic wallet device according to the embodiment.

FIG. 9 is a sequence chart showing the card selection processing (c) based on card inside information in the electronic wallet device 10 of the present embodiment.

As shown in FIG. 9, when the non-contact type IC cards 1A to 1C are inserted into the holding section 102 of the electronic wallet device 10, the control section 105 of the electronic wallet device 10 recognizes the non-contact type IC cards 1A to 1C, reads out the card inside information (e.g. a system code, a service code, service data etc.) which are stored inside the respective non-contact type IC cards 1A to 1C, and registers them onto the card inside information database 140 of the storing section 106 (step S900). Because such code registration processing is performed sequentially at the time when the non-contact type IC cards 1A to 1C are inserted, the card inside information of the respective cards 1A to 1C can be registered in advance before performing the card selection processing.

Next, the control section 105 of the electronic wallet device 10 reads out the card inside information of the non-contact type IC cards 1A to 1C which are registered on the card inside information database 140 (step S901), sets the priorities of the non-contact type IC cards 1A to 1C at the time card selection for each service based on the card inside information (step S902), and registers the set priorities of the non-contact type IC cards 1 for each service onto the priority database 142 (step S903). There are various cases for setting the priorities. For example, for a transportation card, a top priority may be set to a card holding commuter pass and, for an electronic money card, a higher priority may be set to a card having a larger/smaller amount of electronic value charged therein.

On the other hand, the reader/writer 21 of the host device 20 which corresponds to the service A performs polling of the non-contact type IC card 1 that applies to the service A at all times (step S904). If a user holds the electronic wallet device 10 over the reader/writer 21 during the polling, the electronic wallet device 10 accepts a communication request (request command) which is emitted from the reader/writer 21 (step S905). Upon accepting of the communication request, the electronic wallet device 10 carries out the card selection processing based on the card inside information (steps S906 to S907).

Specifically, the control section 105 of the electronic wallet device 10 first reads out a priority table which sets the priorities of the non-contact type IC cards 1A to 1C for the service corresponding to the code from the reader/writer 21 from the priority database 142 of the storing section 106 (step S906). Based on the priority table read out in the step S906, the control section 105 selects the card with a high priority from the non-contact type IC cards 1A to 1C as a candidate card to be used for communication with the reader/writer 21 (step S907).

For example, if a code received from the reader/writer 21 is the code "0x0003" which indicates a transportation service, the control section 105 selects a transportation card with a high priority (e.g. a card storing commuter pass data) from the non-contact type IC cards 1A to 1C according to the priority table for a transportation service in the priority database 142.

In this manner, the electronic wallet device 10 can narrow down candidate cards to be used for communication with the reader/writer 21 based on the card inside information of the respective non-contact type IC cards 1 (e.g. the amount of service data such as balance of charge, the kind of service data etc.).

Figure 10:
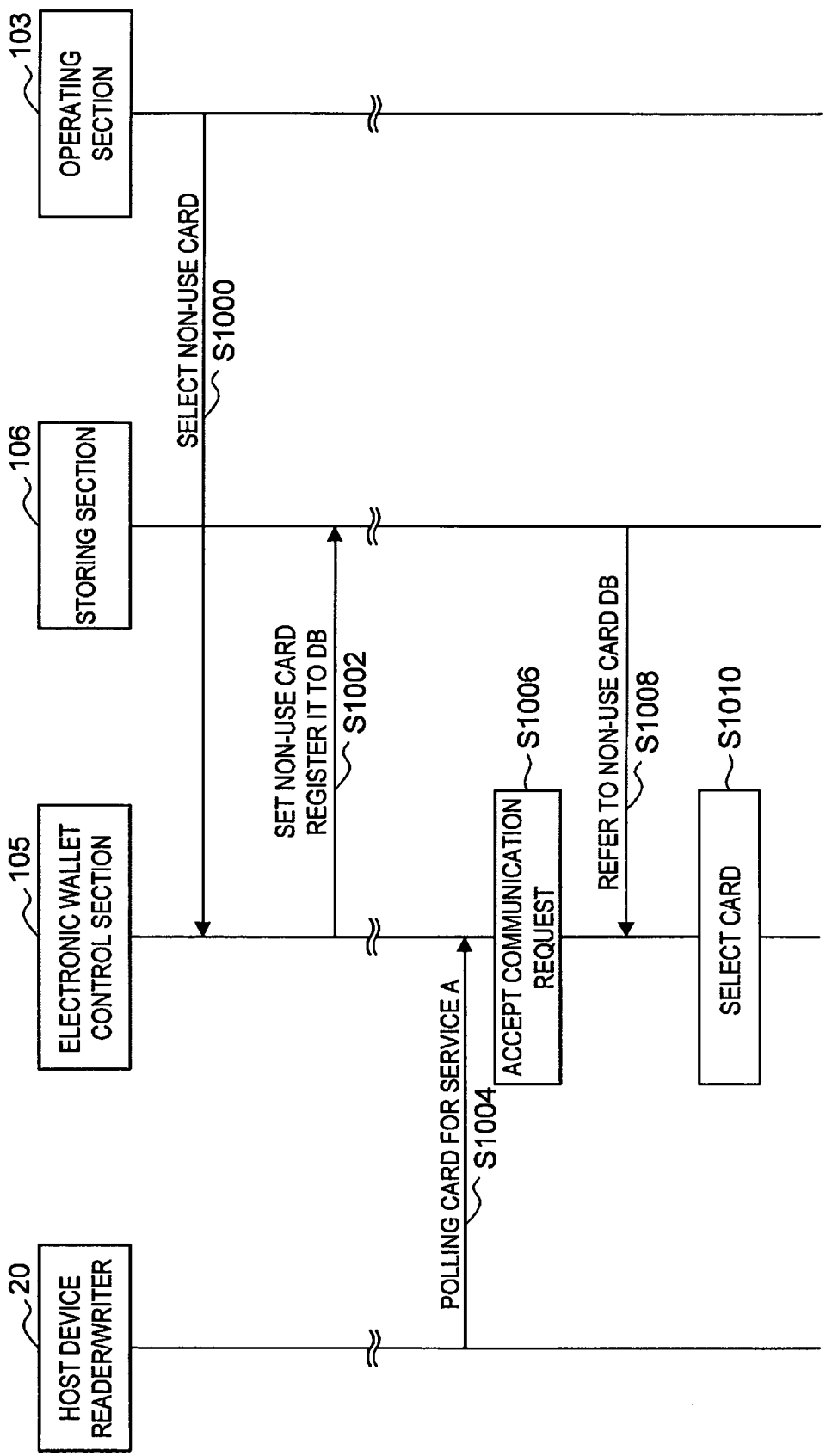
FIG. 10 is a sequence chart showing card selection processing based on a non-use card designated by a user in the electronic wallet device according to the embodiment.

FIG. 10 is a sequence chart showing the card selection processing (d) based on a non-use card which is designated by a user in the electronic wallet device 10 of the present embodiment.

As shown in FIG. 10, a user first selects a non-use card (i.e. the non-contact type IC cards 1 held in the electronic wallet device 10 which a user does not wish to use for communication with the reader/writer 21) from a plurality of non-contact type IC cards 1 held in the holding section 102 by manipulating the operating section 103 of the electronic wallet device 10 (step S1000). Then, the control section 105 of the electronic wallet device 10 sets the non-contact type IC card 1 selected by the user as a non-use card and registers identification information (e.g. a card ID) of the non-use card onto the non-use card database 146 of the storing section 106 (step S1002).

On the other hand, the reader/writer 21 of the host device 20 which corresponds to the service A performs polling of the non-contact type IC card 1 that corresponds to the service A at all times (step S1004). If the user holds the electronic wallet device 10 over the reader/writer 21 during the polling, the electronic wallet device 10 accepts a communication request (request command) which is emitted from the reader/writer 21 (step S1006). Upon accepting of the communication request, the electronic wallet device 10 performs the card selection processing based on the registration of the non-use card (steps S1008 to S1010).

Specifically, firstly, the control section 105 of the electronic wallet device 10 first reads out the identification information of the non-use card from the non-use card database 146 of the storing section 106 (step S1008). Next, the control section 105 identifies the non-use card based on the identification information indicating the non-use card which is read out in the step S1008 and, excluding the non-use card from candidate cards, selects a card to be used for communication with the reader/writer 21 from the other non-contact type IC cards 1 (step S1010).

In this manner, the electronic wallet device 10 can register a non-use card which is designated by a user in advance and, when selecting a card, narrow down candidate cards, excluding the non-use card from candidate cards to be used for communication with the reader/writer 21. It is thereby possible to avoid that the non-contact type IC card 1 which a user does not wish to use is automatically selected and used by the electronic wallet device 10.

Figure 11:
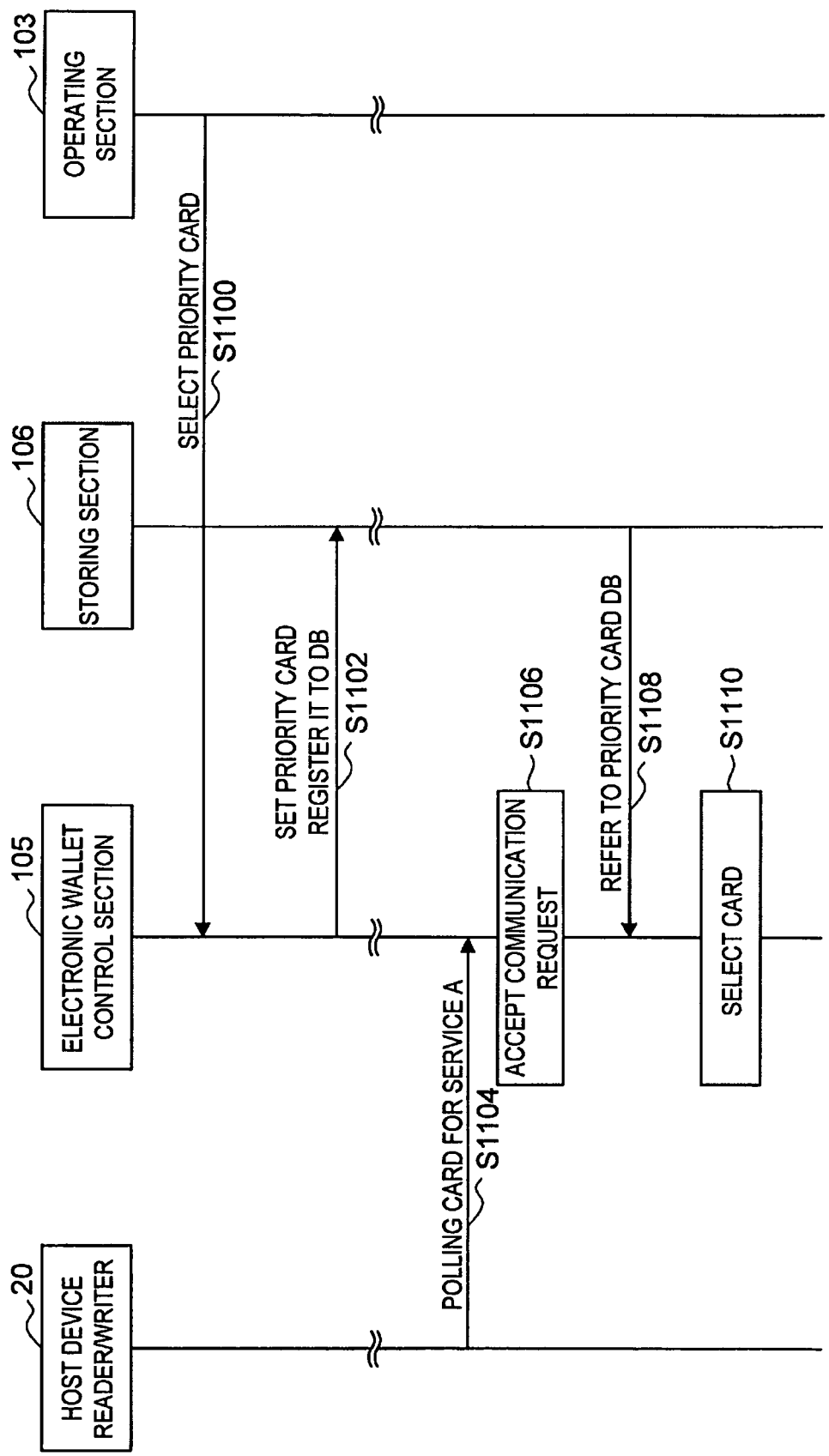
FIG. 11 is a sequence chart showing card selection processing based on a priority card designated by a user in the electronic wallet device according to the embodiment.

FIG. 11 is a sequence chart showing the card selection processing (e) based on a priority card designated by a user in the electronic wallet device 10 of the present embodiment.

As shown in FIG. 11, a user selects a priority card (i.e. the non-contact type IC cards 1 held in the electronic wallet device 10 which a user wishes to preferentially use for communication with the reader/writer 21) from a plurality of non-contact type IC cards 1 held in the holding section 102 by manipulating the operating section 103 of the electronic wallet device 10 (step S100). Then, the control section 105 of the electronic wallet device 10 sets the non-contact type IC card 1 selected by the user as a priority card and registers identification information (e.g. a card ID) of the priority card onto the priority card database 148 of the storing section 106 (step S1102).

On the other hand, the reader/writer 21 of the host device 20 which corresponds to the service A performs polling of the non-contact type IC card 1 that corresponds to the service A at all times (step S104). If the user holds the electronic wallet device 10 over the reader/writer 21 during the polling, the electronic wallet device 10 accepts a communication request (request command) which is emitted from the reader/writer 21 (step S1106). Upon accepting of the communication request, the electronic wallet device 10 performs the card selection processing card based on the registration of the priority card (steps S1108 to S1110).

Specifically, the control section 105 of the electronic wallet device 10 first reads out the identification information of the priority card from the priority card database 148 of the storing section 106 (step S1108). Next, the control section 105 identifies the priority card based on the identification information indicating the priority card which is read out in the step S1108 and selects the priority card preferentially as a candidate card to be used for communication with the reader/writer 21 (step S1110).

In this manner, the electronic wallet device 10 can register the priority card which is designated by a user in advance and, when selecting a card, select the priority card preferentially as a candidate card to be used for communication with the reader/writer 21. It is thereby possible to select and use the non-contact type IC card 1 which a user desires to use automatically by the electronic wallet device 10.

The card selection processing using the respective card selection criteria (a) to (e) is described in the foregoing with reference to FIGS. 7 to 11. The electronic wallet device 10 of this embodiment selects the non-contact type IC card 1 to be used for communication with the reader/writer 21 by sequentially applying the plurality of card selection criteria in combination. An example of the card selection processing which applies a plurality of card selection criteria in combination is described hereinafter with reference to FIGS. 12 and 13.

Figure 12:
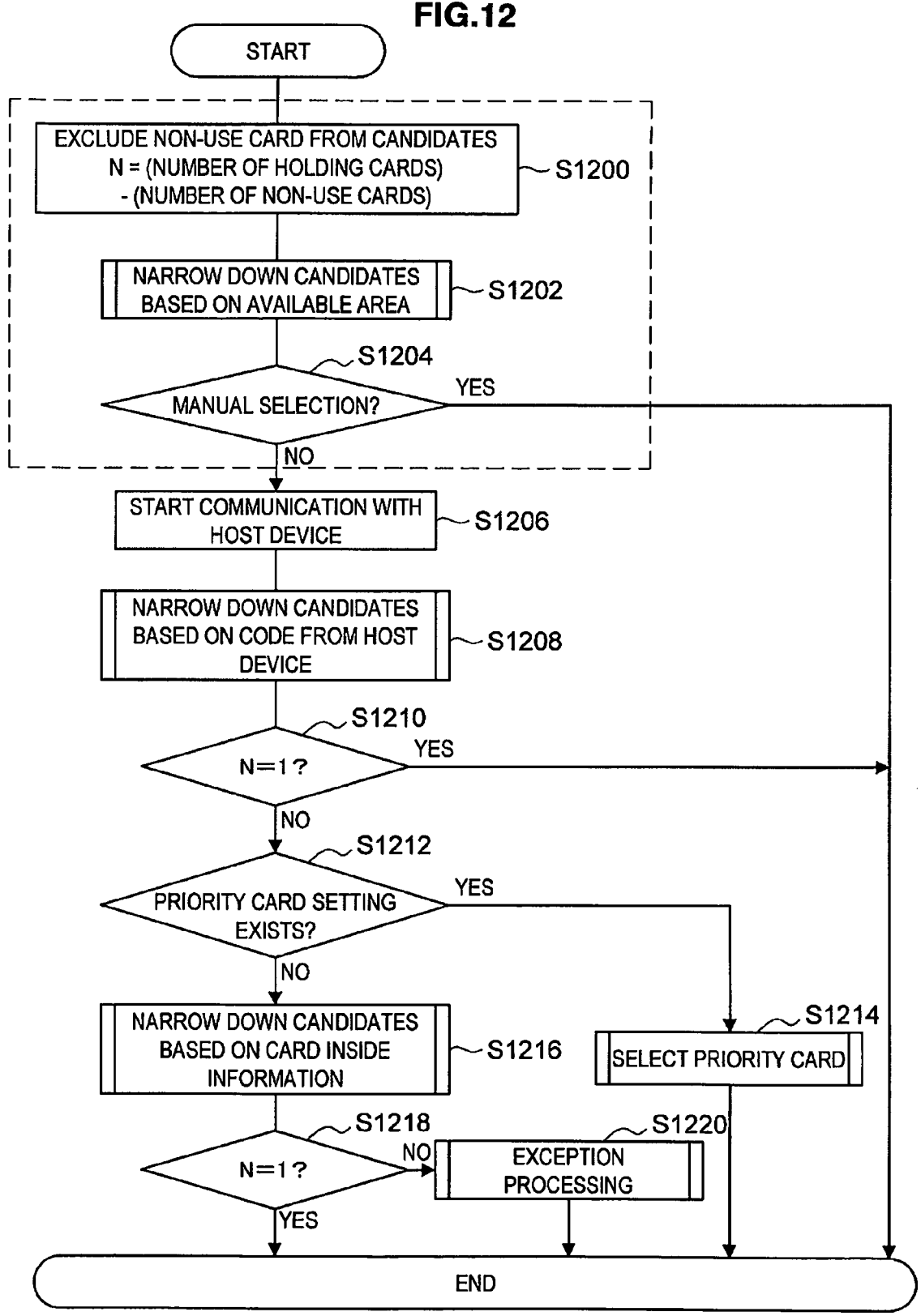
FIG. 12 is a flowchart showing an example of card selection processing applying a plurality of card selection criteria in the electronic wallet device according to the embodiment.

FIG. 12 is a flowchart showing an example of card selection processing which applies a plurality of card selection criteria in the electronic wallet device 10 of the present embodiment. In the below-described flow, it is assumed that a plurality of non-contact type IC cards 1 are inserted into the holding section 102 of the electronic wallet device 10, and the registration of card inside information of each non-contact type IC card 1 and the setting of a non-use card or a priority card by a user are done in advance.

As shown in FIG. 12, the control section 105 of the electronic wallet device 10 first narrows down candidate cards based on the non-use card which is designated by a user (step S1200). Specifically, the control section 105 recognizes the plurality of non-contact type IC cards 1 held in the holding section 102 and excludes the non-use card designated by a user from candidate cards to be used for communication with the reader/writer 21. In the following description, the number of remaining candidate cards to be used for communication with the reader/writer 21 is referred to as "N". In the step S1200, "N=(the number of non-contact type IC cards 1 held in the holding section 102 (the number of held card)–(the number of non-use cards designated by a user)".

Next, the control section 105 further narrows down the candidate cards, which have been narrowed down in the step S1200, based on an available area (step S1202). Specifically, the control section 105 compares the current location information of the electronic wallet device 10 which is acquired from the above-described positioning system 30 with the service area information in the service area database 144. The control section 105 thereby determines the non-contact type IC card 1 which corresponds to a service that is unavailable in the current location of the electronic wallet device 10 and excludes the non-contact type IC card 1 out of the available area from the candidate cards.

Then, the control section 105 determines whether the card selection mode of the electronic wallet device 10 is set to automatic selection mode or manual selection mode (step S1204). When it is set to manual selection mode, the non-contact type IC card 1 is selected by a user manually according to need at the time of communication with the reader/writer 21. On the other hand, when it is set to automatic section mode, the process proceeds to the step S1206 and executes the following automatic selecting function.

The processing of narrowing down cards described above in the steps S1200 to S1204 is performed in advance before the start of communication between the electronic wallet device 10 and the reader/writer 21 of the host device 20. The card selection processing based on a non-use card (S1200), the card selection processing based on an available area (S1202) and so on can be performed without depending on a service provided by the reader/writer 21 before the reader/writer 21 to be communicated with is determined (that is, before the electronic wallet device 10 is held over the reader/writer 21). Therefore, the electronic wallet device 10 performs such card selection processing (S1200 and S1202) in advance and narrows down candidate cards before starting communication between the electronic wallet device 10 and the reader/writer 21. This reduces the amount of card selection processing in the electronic wallet device 10 during the communication, thereby enhancing a processing speed and increasing the efficiency of card selection processing.

After that, a user holds the electronic wallet device 10 over the reader/writer 21 of the host device 20, and communication between the electronic wallet device 10 and the reader/writer 21 is started (step S1206). Upon starting of the communication, the card selection processing based on a plurality of card selection criteria depending on a service provided by the reader/writer 21 is performed as described below.

First, the control section 105 further narrows down the candidate cards, which have been narrowed down by the step S1202, based on a code which is contained in a communication request from the reader/writer 21 of the host device 20 (step S1208). Specifically, a communication request (request command) which is emitted during the polling by the reader/writer 21 contains a code that indicates a service provided by the reader/writer 21 (e.g. a system code, a service code etc.). The service provided by the reader/writer 21 is identified by the code, so that the non-contact type IC card 1 to which the communication request from the reader/writer 21 is to be made can be identified. Receiving the communication request from the reader/writer 21, the control section 105 of the electronic wallet device 10 checks the code contained in the communication request against the codes to which the respective non-contact type IC cards 1 held in the holding section 102 correspond. The control section 105 thereby determines a card which is applicable to the service for which the communication request is made from the reader/writer 21 and a card which not applicable to the service among the non-contact type IC cards 1 in the electronic wallet device 10. It is thereby possible to narrow down the candidate cards based on the code received from the reader/writer 21.

The control section 105 then determines whether the number N of remaining candidate cards becomes one as a result of the narrowing down based on the code in the step S1208 (step S1210). If N=1, the remaining candidate card is selected as the non-contact type IC card 1 to be used for communication with the reader/writer 21. If, on the other hand, N is two or more, the process proceeds to the step S1212.

The control section 105 further determines whether a priority card designated by a user is set and whether priorities for use are set in the electronic wallet device 10 (step S1212). If a priority card is set, the control section 105 selects a card with a high priority from the priority cards designated by a user as the non-contact type IC card 1 to be used for communication with the reader/writer 21 (step S1214).

If, on the other hand, a priority card is not set, the control section 105 narrows down the candidate cards, which have been narrowed down by the step S1212, based on card inside information (step S1216). Specifically, the control section 105 determines the priorities of the remaining candidate cards based on the card inside information of those card and further narrows down the candidate cards. At this time, the control section 105 may read out the priority information based on the card inside information which is prestored in the priority database 142 and narrow down the candidate cards based on the card inside information according to the priority information. Alternatively, the control section 105 may read out the card inside information from each candidate card which is held in the holding section 102 and compare the card inside information to thereby narrow down the candidate cards based on the card inside information. For example, if a candidate card is an electronic money card, a card which has a largest/smallest amount of electronic value charged therein is selected. If a candidate card is a transportation card, a commuter pass card is preferentially selected.

After that, the control section 105 determines whether the number N of remaining candidate cards becomes one as a result of the narrowing down based on the card inside information in the step S1216 (step S1218). If N=1, the remaining candidate card is selected as the non-contact type IC card 1 to be used for communication with the reader/writer 21. If, on the other hand, N is two or more, the process proceeds to the step S1220 and performs the exception processing.

The exception processing in the step S1220 is performed in case where the candidate cards are not narrowed down to one even after applying all the card selection criteria in the steps S1200, S1202, S1208, S1212 and S1216. In the exception processing, the control section 105 of the electronic wallet device 10 gives a notification to prompt a user to manually select the non-contact type IC card 1 to be used for communication with the reader/writer 21 and then selects the non-contact type IC card 1 which is selected manually by a user, for example. Alternatively, the control section 105 of the electronic wallet device 10 may automatically select the non-contact type IC card 1 which is inserted in the slot with a smaller slot number in the holding section 102.

By the process flow described above, the electronic wallet device 10 narrows down the candidate cards by sequentially applying a plurality of card selection criteria. An appropriate non-contact type IC card 1 to be used for communication with the reader/writer 21 is thereby selected. By separating the card selection criteria to be applied before communication between the electronic wallet device 10 and the host device 20 (S1200, S1202) and the card selection criteria to be applied after the communication (S1208, S1212, S1216, S1220), it is possible to increase the efficiency of the entire card selection processing which applies a plurality of card selection criteria sequentially.

Figure 13:
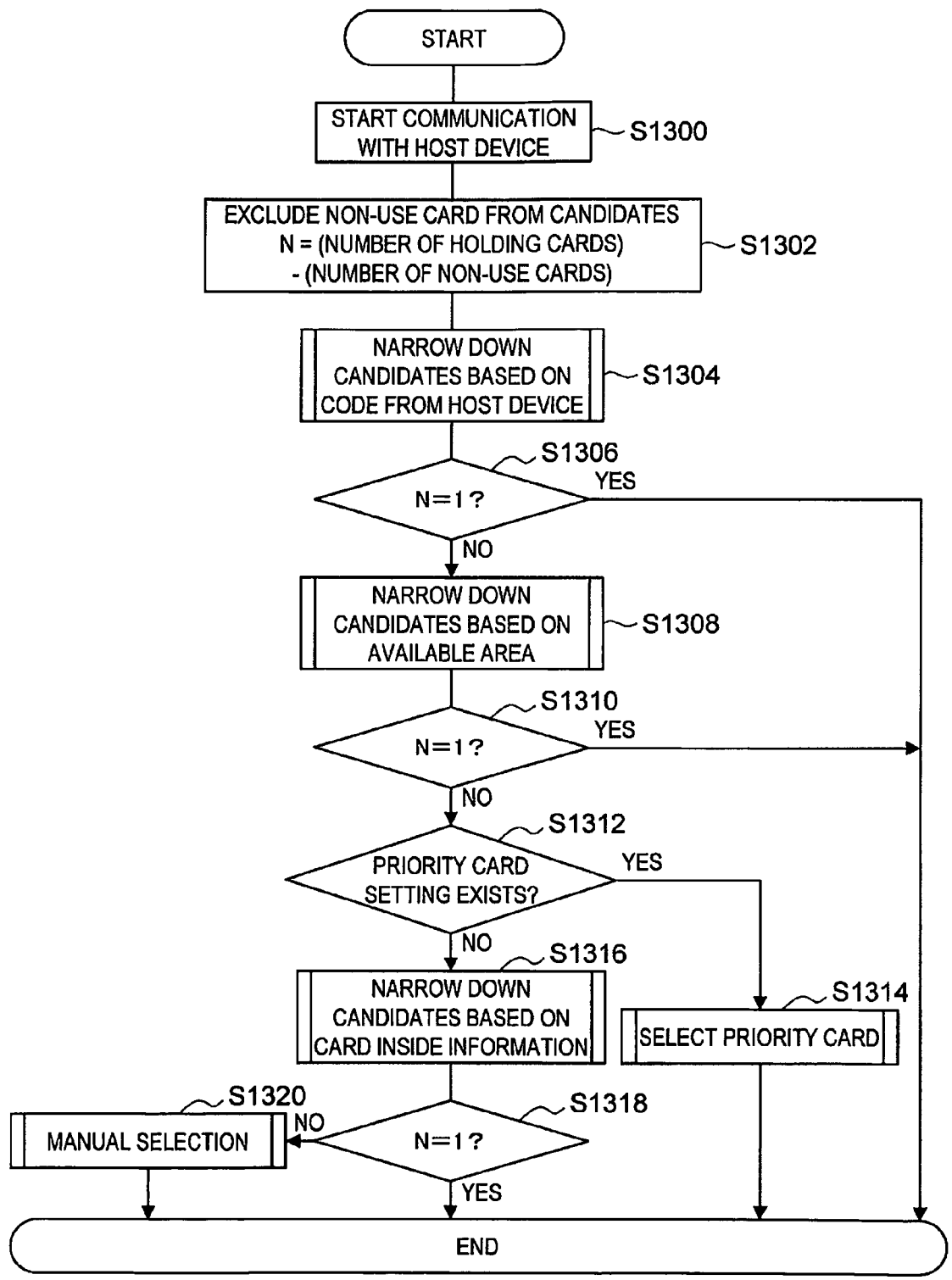
FIG. 13 is a flowchart showing another example of card selection processing applying a plurality of card selection criteria in the electronic wallet device according to the embodiment.

FIG. 13 is a flowchart showing another example of card selection processing which applies a plurality of card selection criteria in the electronic wallet device 10 of the present embodiment. In the following flow also, it is assumed that a plurality of non-contact type IC cards 1 are inserted into the holding section 102 of the electronic wallet device 10, and the registration of card inside information of the respective non-contact type IC cards 1 and the setting of a non-use card or a priority card by a user are done in advance.

As shown in FIG. 13, a user first holds the electronic wallet device 10 over the reader/writer 21 of the host device 20, and communication between the electronic wallet device 10 and the reader/writer 21 is started (step S1300). Upon starting of the communication, the card selection processing based on a plurality of card selection criteria is performed as described below.

Then, the electronic wallet device 10 receives a communication request from the reader/writer 21 of the host device 20, and the control section 105 narrows down candidate cards based on a non-use card which is designated by the user (step S1302). The step S1302 is substantially the same as the step S1200 in FIG. 12 and thus not described in detail herein.

The control section 105 further narrows down the candidate cards, which have been narrowed down by the step S1302, based on the code which is contained in the communication request from the reader/writer 21 (step S1304). The step S1304 is substantially the same as the step S1208 in FIG. 12 and thus not described in detail herein.

The control section 105 then determines whether the number N of remaining candidate cards becomes one as a result of the narrowing down based on the code in the step S1304 (step S1306). If N=1, the remaining candidate card is selected as the non-contact type IC card 1 to be used for communication with the reader/writer 21. If, on the other hand, N is two or more, the process proceeds to the step S1308.

After that, the control section 105 further narrows down the candidate cards, which have been narrowed down by the step S1304, based on an available area (step S1308). The step S1308 is substantially the same as the step S1202 in FIG. 12 and thus not described in detail herein.

The control section 105 then determines whether the number N of remaining candidate cards becomes one as a result of the narrowing down based on the available area in the step S1308 (step S1310). If N=1, the remaining candidate card is selected as the non-contact type IC card 1 to be used for communication with the reader/writer 21. If, on the other hand, N is two or more, the process proceeds to the step S1312.

The control section 105 further determines whether a priority card designated by a user is set and whether priorities for use are set in the electronic wallet device 10 (step S1312). If a priority card is set, the control section 105 selects a card with a high priority from the priority cards designated by a user as the non-contact type IC card 1 to be used for communication with the reader/writer 21 (step S1314).

If, on the other hand, a priority card is not set, the control section 105 narrows down the candidate cards, which have been narrowed down by the step S1312, based on card inside information (step S1316). The step S1316 is substantially the same as the step S1216 in FIG. 12 and thus not described in detail herein.

After that, the control section 105 determines whether the number N of remaining candidate cards becomes one as a result of the narrowing down based on the card inside information (step S1318). If N=1, the remaining candidate card is selected as the non-contact type IC card 1 to be used for communication with the reader/writer 21. If, on the other hand, N is two or more, the process proceeds to the step S1320 and performs manual selection.

In the step S1320, the electronic wallet device 10 gives a notification to prompt a user to manually select the non-contact type IC card 1 to be used for communication with the reader/writer 21 and then selects the non-contact type IC card 1 which is selected manually by a user.

In stead of performing manual selection in the step S1320, it is feasible to perform communication processing between the non-contact type IC card 1 and the reader/writer 21 one by one for each of the remaining plurality of candidate cards by trial. In such a case, when the reader/writer 21 of the host device 20 returns an error different from a system error such as communication failure to the electronic wallet device 10 or when a response from the reader/writer 21 becomes time-out, the electronic wallet device 10 performs communication processing between the next candidate card and the reader/writer 21. The electronic wallet device 10 can thereby automatically select one card without depending on manual selection by a user when candidate cards are not narrowed down to one card even after applying the above-described plurality of card selection criteria.

By the process flow described above, the electronic wallet device 10 narrows down the candidate cards by sequentially applying a plurality of card selection criteria after starting communication between the electronic wallet device 10 and the reader/writer 21. An appropriate non-contact type IC card 1 to be used for communication with the reader/writer 21 is thereby selected. At this time, the electronic wallet device 10 applies a plurality of card selection criteria sequentially in the order of: the card selection criterion based on a non-use card designated by a user (S1302), the card selection criterion based on a code received from the reader/writer 21 (S1304), the card selection criterion based on an available area (S1308), the card selection criterion based on a priority card designated by a user (S1312), the card selection criterion based on card inside information (S1316), and the card selection criterion based on manual selection by a user (S1320). It is thereby possible to minimize the number of times of applying the card selection criteria so as to select a card efficiently.

The electronic wallet device 10 and the communication method including card selection processing using the electronic wallet device 10 according to the embodiment of the present invention are described in the foregoing. According to the embodiment, a user can carry a plurality of non-contact type IC cards 1 all together by holding them in the electronic wallet device 10. At the time of using the non-contact type IC card 1, a user simply holds the electronic wallet device 10 over the reader/writer 21 of the host device 20, and the electronic wallet device 10 automatically selects the non-contact type IC card 1 which is appropriate for use in communication with the reader/writer 21 and establishes communication between the non-contact type IC card 1 and the reader/writer 21. At this time, only the selected non-contact type IC card 1 can suitably communicate with the reader/writer 21 without being interfered by the other non-contact type IC cards 1.

Because the electronic wallet device 10 selects only one appropriate non-contact type IC card 1 and establishes communication with the reader/writer 21, it is possible to execute communication appropriately between the selected non-contact type IC card 1 and the reader/writer 21 regardless of whether each non-contact type IC card 1 held therein or the reader/writer 21 supports anti-collision. This allows a user to carry a plurality of non-contact type IC cards 1 all together and use them even if the cards do not support anti-collision.

Further, there have been cases where a system judges it as an error when a plurality of non-contact type IC cards 1 corresponding to the same kind of service (e.g. two transportation cards applicable to the same kind of automatic ticket gate service) are held over the reader/writer 21 at the same time, even if the non-contact type IC cards 1 support anti-collision. However, according to the electronic wallet device 10 of this embodiment, it is possible to automatically select one non-contact type IC card 1 by applying the selection criteria based on card inside information, the selection criteria based on a non-use card or a priority card designated by a user and so on even when a plurality of non-contact type IC cards 1 corresponding to the same kind of service are held over the reader/writer 21 at the same time, thereby enabling normal communication.

As the plurality of card selection criteria to be applied for card selection, appropriate card selection criteria are chosen according to a code received from the reader/writer 21, and then the chosen card selection criteria are applied sequentially in appropriate priorities according to the code. It is thereby possible to narrow dawn candidate cards by applying the appropriate card selection criteria corresponding to a service provided by the reader/writer 21 in an appropriate order. This increases the efficiency of card selection processing in the electronic wallet device 10 so as to execute the processing rapidly with a smaller data processing amount.

It should be understood by those skilled in the art that various modifications, combinations, sub-combinations and alterations may occur depending on design requirements and other factors insofar as they are within the scope of the appended claims or the equivalents thereof.

For example, although the electronic wallet device 10 of the above-described embodiment is configured in a single unit, the present invention is not limited thereto. For example, the electronic wallet device may be combined with a portable terminal such as a mobile phone, a personal digital assistant (PDA), an electronic organizer, or a portable video/audio player.

Further, the electronic wallet device 10 according to the above-described embodiment has a housing structure that inserts three non-contact type IC cards 1A to 1C in parallel in the same direction. However, the number of non-contact type IC cards which can be held in the electronic wallet device, the direction of insertion, the location of held cards and so on are not limited to those described in the above embodiment.

Furthermore, the card selection criteria to be applied in the electronic wallet device 10 are not limited to the card selection criteria (a) to (e) described in the above embodiment. For example, arbitrary card selection criteria based on a current time, a valid period of the non-contact type IC card 1, a use history of the non-contact type IC card 1, an acquisition time of the non-contact type IC card 1, user information and so on may be applied.

What is claimed is:

1. An electronic wallet device comprising:
    a holding section to hold a plurality of non-contact type IC cards for non-contact communication with an external unit;
    an external communication antenna to perform non-contact communication with the external unit;
    a card communication antenna to perform non-contact communication with the plurality of non-contact type IC cards held in the holding section;
    a card selecting section to select at least one non-contact type IC card by narrowing down candidates for a non-contact type IC card to be used for communication with the external unit from the plurality of non-contact type IC cards held in the holding section based on a plurality of different card selection criteria when receiving a communication request concerning a prescribed service from the external unit via the external communication antenna; and
    a communication control section to connect the at least one non-contact type IC card selected by the card selecting section with the external unit via the external communication antenna and the card communication antenna so that the selected non-contact type IC card and the external unit communicate with each other, the card selecting section determines current location information of the electronic wallet device and narrows down candidates for a non-contact type IC card based on the current location information.

2. The electronic wallet device according to claim 1, wherein the card selecting section narrows down candidates for a non-contact type IC card to be used for communication with the external unit by applying the plurality of card selection criteria sequentially in accordance with priorities based on a code contained in the communication request.

3. The electronic wallet device according to claim 1, wherein the card selecting section selects at least one of the plurality of card selection criteria based on a code contained in the communication request and narrows down candidates for a non-contact type IC card to be used for communication with the external unit by applying the selected card selection criteria sequentially.

4. The electronic wallet device according to claim 1, further comprising:

a storing section to store service area information indicating a service area where each non-contact type IC card is available, wherein the card selecting section acquires current location information of the electronic wallet device from a positioning system and narrows down candidates for a non-contact type IC card to be used for communication with the external unit based on the current location information and the service area information read out from the storing section.

5. The electronic wallet device according to claim 1, further comprising:

a card inside information registration section to register a code concerning a service to which each of the plurality of non-contact type IC cards held in the holding section corresponds onto a storing section, wherein the card selecting section narrows down candidates for a non-contact type IC card to be used for communication with the external unit based on a code contained in the communication request received from the external unit and the code read out from the storing section.

6. The electronic wallet device according to claim 1, wherein the card selecting section narrows down candidates for a non-contact type IC card to be used for communication with the external unit based on card inside information stored in each of the plurality of non-contact type IC cards held in the holding section.

7. The electronic wallet device according to claim 6, further comprising:

a priority determination section to determine priorities of the plurality of non-contact type IC cards for each service based on the card inside information, wherein the card selecting section narrows down candidates for a non-contact type IC card to be used for communication with the external unit based on the priorities determined by the priority determination section.

8. The electronic wallet device according to claim 1, further comprising:

a non-use card registration section to register non-use cord information indicating a non-use card designated by a user onto a storing section, wherein the card selecting section excludes the non-use card from candidates for a non-contact type IC card to be used for communication with the external unit based on the non-use card information read out from the storing section.

9. The electronic wallet device according to claim 1, further comprising:

a priority card registration section to register priority card information indicating a priority card designated by a user onto a storing section, wherein the card selecting section preferentially selects the priority card as a candidate for a non-contact type IC card to be used for communication with the external unit based on the priority card information read out from the storing section.

* * * * *